United States Patent [19]

Kato et al.

[11] Patent Number: 4,832,464
[45] Date of Patent: May 23, 1989

[54] OPTICAL SYSTEM WITH GRATING LENS ASSEMBLY FOR CORRECTING WAVELENGTH ABERRATIONS

[75] Inventors: Masayuki Kato; Satoshi Maeda, both of Atsugi; Fumio Yamagishi, Ebina; Hiroyuki Ikeda, Yokohama; Takefumi Inagaki, Kawasaki, all of Japan

[73] Assignee: Fujitsu Limited, Kawasaki, Japan

[21] Appl. No.: 98,532

[22] Filed: Sep. 18, 1987

[30] Foreign Application Priority Data

| | | | |
|---|---|---|---|
| Sep. 20, 1986 | [JP] | Japan | 61-220870 |
| Dec. 18, 1986 | [JP] | Japan | 61-300028 |
| Dec. 19, 1986 | [JP] | Japan | 61-301716 |
| Dec. 20, 1986 | [JP] | Japan | 61-302791 |
| Feb. 25, 1987 | [JP] | Japan | 62-040433 |
| Mar. 18, 1987 | [JP] | Japan | 62-061112 |
| Mar. 20, 1987 | [JP] | Japan | 62-064167 |

[51] Int. Cl.$^4$ .......................... G02B 5/32; G02B 5/18; G02B 27/44
[52] U.S. Cl. ............................... 350/3.72; 350/162.16
[58] Field of Search ................... 350/3.7, 3.72, 162.16, 350/162.2, 320

[56] References Cited

U.S. PATENT DOCUMENTS

| | | | |
|---|---|---|---|
| 3,794,426 | 2/1974 | Mueller et al. | 356/300 |
| 4,458,980 | 7/1984 | Ohki et al. | 350/3.73 |
| 4,502,762 | 3/1985 | Anderson | 350/394 |
| 4,550,973 | 11/1985 | Hufnagel | 350/3.72 |

FOREIGN PATENT DOCUMENTS

| | | |
|---|---|---|
| 0062545 | 8/1982 | European Pat. Off. . |
| 0123048 | 10/1984 | European Pat. Off. . |
| 0171816 | 2/1986 | European Pat. Off. . |
| 0195657 | 9/1986 | European Pat. Off. . |
| 2917163 | 11/1979 | Fed. Rep. of Germany . |
| 58-79207 | 5/1983 | Japan ........................ 350/3.72 |
| 59-160166 | 9/1984 | Japan . |
| 60-66337 | 4/1985 | Japan . |

OTHER PUBLICATIONS

Madjidi–Zolbanine, H., et al "Holographic Correction of Both Chromatic and Spherical Sberrations of Single Glass Lenses," *Applied Optics*, vol. 18, No. 14, 15 Jul. 1979, pp. 2385–2393.

Weingartner, Optik, vol. 66, No. 3, Feb. 1984, Stuttgart, West Germany.

Weingartner, Optics Communiations, vol. 58, No. 6, Jul. 1986, Amsterdam, Netherlands.

Sincerbox, Chromatic Correction with a Laser Diode/Halographic Deflector, IBM Technical Disclosure Bulletin, vol. 27, No. 5, Oct. 1984.

Patent Abstracts of Japan, vol. 130, p. 391, May 25th 1985; & JP-A-60 093 644 (Hiroshige Sangyo), 25-0-5-1985.

Patent Abstracts of Japan, vol. P 381, Apr. 16th 1985; & Jp-A-60 066 337 (Sony) 16-04-1985.

Optics Communications, vol. 58, No. 6, Jul. 1986, pp. 385–388, Amsterdam, NL; I. Weingartner: "Real and Achromatic Imaging with Two Planar Holographic Optical Elements" * especially figures 2, 3; p. 388 *.

IBM Technical Disclosure Bulletin, vol. 27, No. 5, Oct. 1934; G. T. Sicerbox: "Chromatic Correction for a Laser Diode/Holographic Deflector".

Optik, vol. 66, No. 3, Feb. 1984, pp. 277–287, Stuttgart; I. Weingarten et al.: "Entwurf und Realisierung eines Projektions–System mit Holographischer Abbildungsoptik" * especially p. 282 middle *.

*Primary Examiner*—John K. Corbin
*Assistant Examiner*—David J. Edmondson
*Attorney, Agent, or Firm*—Staas & Halsey

[57] ABSTRACT

An optical system having a grating lens assembly including a first grating lens which diffracts rays of a beam incident thereupon so as to provide non-parallel diffraction rays and a second grating lens which converges the non-parallel diffraction rays at a predetermined point substantially without aberration.

45 Claims, 45 Drawing Sheets

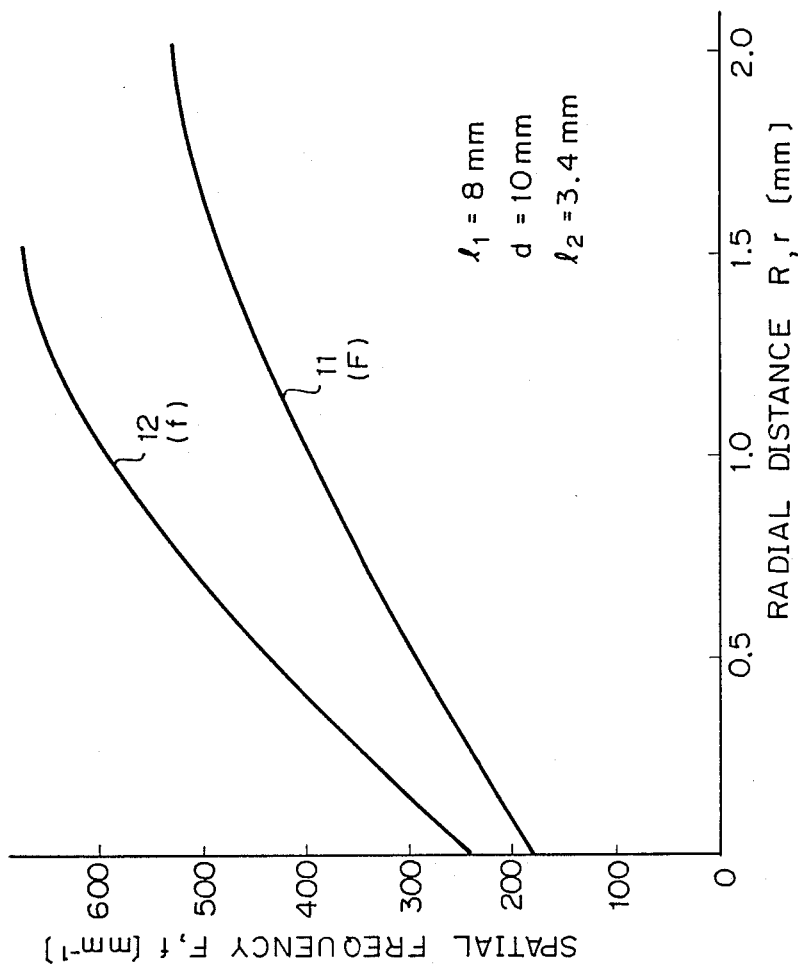

Fig. 44
Fig. 45
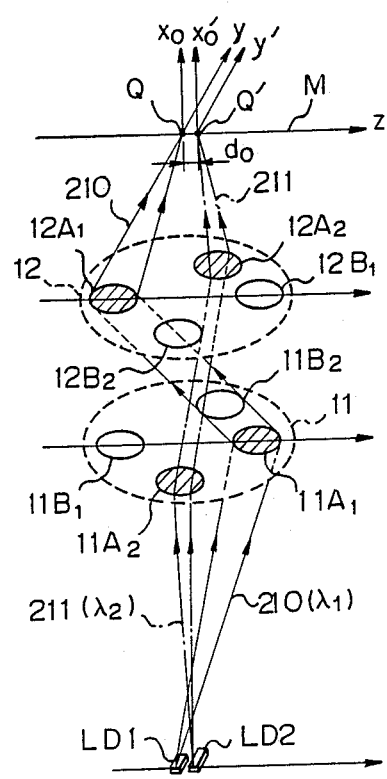
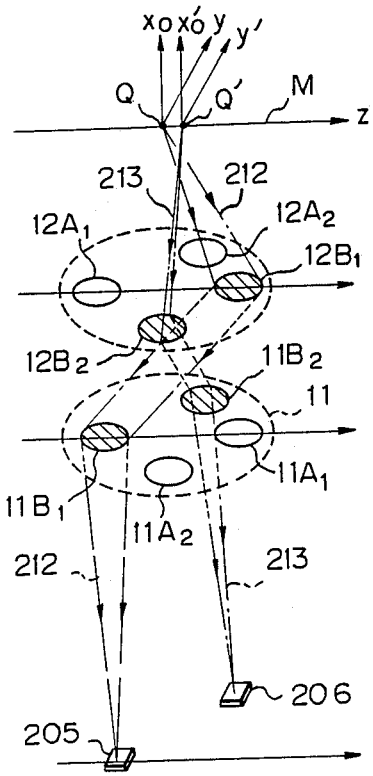

Fig. 52
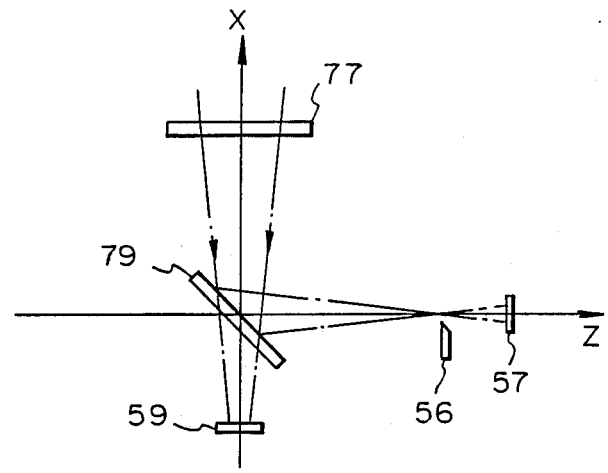
Fig. 53A
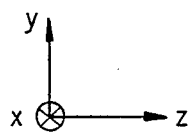
(a)
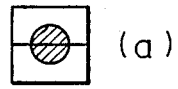
(b)
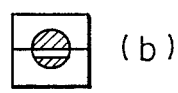
(c)
Fig. 53B
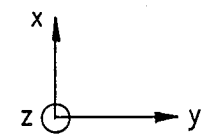
(a)
(b)
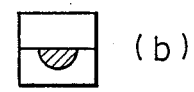
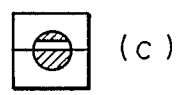
(c)

$-\cdot\cdot-\ \lambda_2\ (<\lambda_0)$
$\underline{\qquad}\ \lambda_0$
$-\cdot-\ \lambda_1\ (>\lambda_0)$

WAVELENGTH CONTROL UNIT

OPTICAL SYSTEM WITH GRATING LENS ASSEMBLY FOR CORRECTING WAVELENGTH ABERRATIONS

BACKGROUND OF THE INVENTION

1. Field of the Invention

The present invention relates to an optical system with a grating lens assembly which converges rays of light.

Grating lenses are used in optical system such as optical heads of optical disk apparatuses, in which a divergent bundle of rays of spherical waves from a coherent light source is converged upon a point, to realize compact, light, and inexpensive optical systems with reduced access times. Grating lenses are usually thinner, lighter, and more suited for mass production than conventional optical elements

2. Description of the Related Art

A grating lens functions to converge a bundle of parallel rays of only a specific wavelength upon a point. Accordingly, if the wavelength changes, the grating lens no longer converges the bundle of rays. Namely, use of a grating lens has the drawback that if the wavelength deviates from a predetermined value, an aberration occurs and/or a deviation of the focal point takes place.

A semiconductor laser is usually used as a coherent light source in an optical head of an optical disk apparatus. The wavelength of the semiconductor laser usually fluctuates in accordance with changes in the ambient temperature, which is usually not constant, and with changes in a driving current of the laser.

SUMMARY OF THE INVENTION

The primary object of the present invention is to eliminate the above-mentioned drawbacks of the prior art by providing an optical system with a grating lens assembly which substantially absorbs the deviation of the wavelength of the incident light so as to create a good beam spot on a focal point substantially without aberration.

Another object of the present invention is to provide a reliable and precise optical pickup which has the grating lens assembly as mentioned above which is substantially free from aberration even if the wavelength of the incident light changes.

Still another object of the present invention is to provide a reliable and precise focusing device which has the grating lens as mentioned above which is substantially free from aberration even if the wavelength of the incident light changes.

To achieve the objects mentioned above, according to the present invention, there is provided an optical system having a grating lens assembly comprising a first grating lens, which diffracts rays of an incident beam so as to provide non-parallel diffraction rays, and a second grating lens, which converges the non-parallel diffraction rays with a predetermined pattern substantially without abberation.

According to the present invention, the optical system having the grating lens assembly mentioned above may be applied to an optical pickup which can be used, for example, in an optical disk apparatus to provide a good beam spot without an aberration or deviation of the focal point.

According to another aspect of the present invention, there is provided a focusing apparatus in which the focus can be controlled by using an optical system having a grating lens assembly as mentioned above. The focus can be varied by changing the wavelength of the incident beam.

According to still another aspect of the present invention, the focusing apparatus is applied to a beam scanning apparatus, in which a beam can be focused on and along a predetermined pattern.

BRIEF DESCRIPTION OF THE DRAWINGS

The invention will be described below in detail with reference to the accompanying drawings, in which:

FIG. 2 is a diagram showing an example of distribution of spatial frequencies of grating lenses shown in FIG. 1;

FIG. 44 is a schematic view of a two-beam type of optical pickup in which an incident beam is converged, according to the present invention;

FIG. 45 is a schematic view of a two-beam type of optical pickup in which a signal beam is converged, according to the present invention;

FIG. 52 is a view showing a variant of FIG. 50;

FIG. 53A is a view showing a tracking method in an arrangement shown in FIG. 52;

FIG. 53B is a view showing a focusing method in an arrangement shown in FIG. 52;

DETAILED DESCRIPTION OF THE PREFERRED EMBODIMENTS

Figure 73:
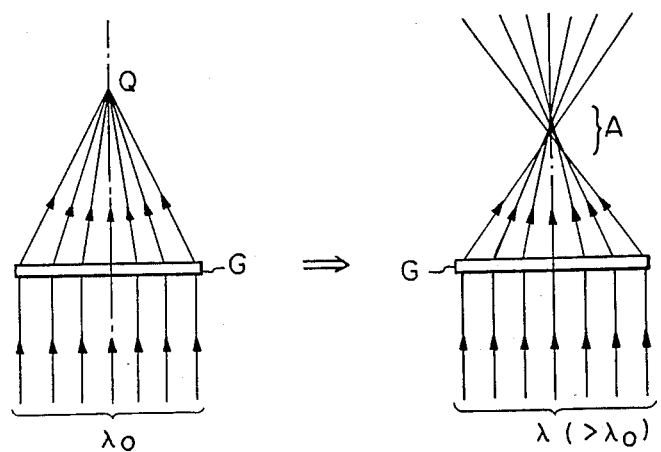
FIG. 73 is a view showing an aberration in an in-line type of grating lens according to the prior art.

To better understand the present invention first referring to FIGS. 73 to 77, which show the prior art, a conventional grating lens G shown in FIG. 73 converges a bundle of parallel rays of only a specific wavelength $\lambda_0$ upon a focal point Q. Accordingly, the grating lens G does not converge the bundle of parallel rays of a different wavelength $\lambda$ ($\lambda > \lambda_0$ in FIG. 73) upon the focal point Q. Namely, aberration occurs as shown at A in FIG. 73. This results in a bad conversion efficiency. The same is true when the wavelength of the incident light changes to a smaller value ($\lambda < \lambda_0$).

Figure 74A:
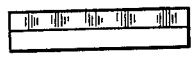
FIGS. 74A, 74B, and 74C are views showing various known hologram lenses.
Figure 74B:
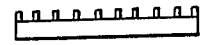
Figure 74C:
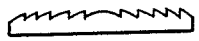

This kind of phenomenon occurs commonly with a lens which diffracts rays of light. Namely, the aberration takes place when the wavelength of the incident light changes, for example in a volume hologram lens as shown in FIG. 74A, a surface relief hologram as shown in FIG. 74B, and a blazed grating lens as shown in FIG. 74C.

Figure 75:
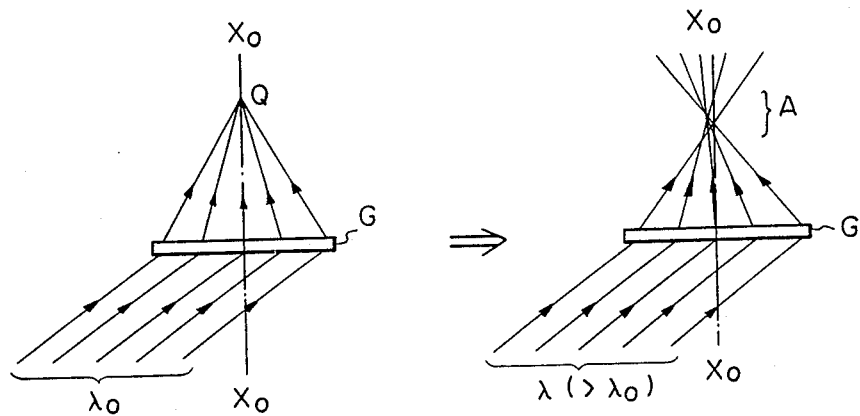
FIG. 75 is a view showing an aberration and deviation of a focal point in an off-axis type of grating lens according to the prior art.

FIG. 75 shows the occurrence of aberration in an off-axis type of grating lens G. In the case of an off-axis type of grating lens, deviation of the focal point from the optical axis $X_0-X_0$ occurs in addition to the aberration, as can be seen from FIG. 75.

As can be understood from the foregoing and as is well known, a grating lens causes an aberration when the wavelength of the light incident thereupon deviates from a predetermined value ($\lambda_0$), resulting in a bad conversion of a bundle of rays. In addition, deviation of the focal point from an optical axis takes place in certain kinds of lenses.

Figure 76A:
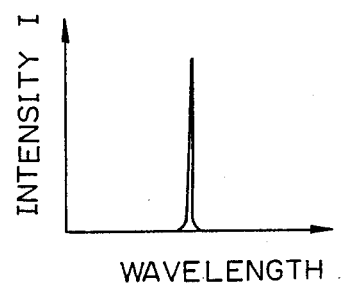
FIGS. 76A and 76B are diagrams showing light intensities of a single-mode semiconductor laser and a multimode semiconductor laser, respectively.
Figure 76B:
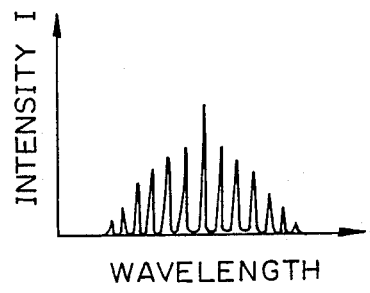

For instance, in an optical head in an optical disk apparatus, a semiconductor laser is usually used as a coherent light source. There are two types of semiconductor laser: a single mode laser and a multimode laser. FIGS. 76A and 76B show states of the wavelengths of the respective lasers.

In conventional common optical heads in which normal optical lenses are used, there is substantially no change in a beam spot on a focal point even if the wavelength of the incident light upon the optical lenses changes. Accordingly, both the single mode laser and the multimode laser can be used. However, in the case of optical heads in which conventional grating lenses as mentioned above are used, only the single mode laser can be used, since the change in wavelength of the incident laser beam has a large influence on a converged beam spot, as mentioned before.

It should be recalled that even the single mode laser changes in its wavelength depending on the ambient temperature.

Figure 77:
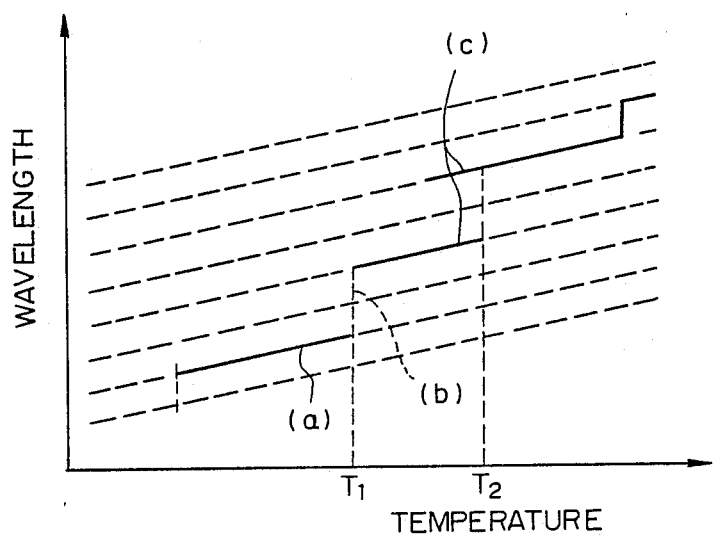
FIG. 77 is a diagram showing variation of wavelength depending on temperature in a single mode semiconductor laser.

FIG. 77 shows the relationship between wavelength and temperature in a single mode semiconductor laser assuming a constant laser output. As can be seen from FIG. 77, (a) the wavelength continuously and gradually changes in accordance with the temperature; (b) the wavelength discontinuously changes at a certain temperature T1 (referred to as a mode hop hereinafter), and (c) more than two wavelengths exist at a certain temperature T2, etc.

Accordingly, in an optical head using a grating lens, even when a single mode semiconductor laser is used as a light source, the wavelength thereof varies in accordance with change of temperature, which is usually not constant, so that the quality of the beam spot obtained by the conversion decreases, and, in some cases, the position of the focal point changes.

This leads to enlargement of the diameter of a beam spot on a photo-medium, such as an optical disk, to deviation of tracks, to deviation of a focus, etc.

In particular, when the wavelength is varied by the mode hop shown in FIG. 77, the existing servo-system cannot follow the change since the change is discontinuous.

One solution to these problems is to control the ambient temperature by a temperature controller provided outside. In fact, such a temperature control system is also known. However, since there is a difference in driving current between when information is written on the optical disk and when the information is read out from the optical disk, the temperature at the junction largely varies. Accordingly, it is almost impossible to precisely control the temperature by the temperature controller.

Another solution is to effectively absorb the change of the wavelength of the laser. Japanese Unexamined Patent Publication (Kokai) No. 59-160166 discloses such an idea, as shown in FIG. 78.

Figure 78:
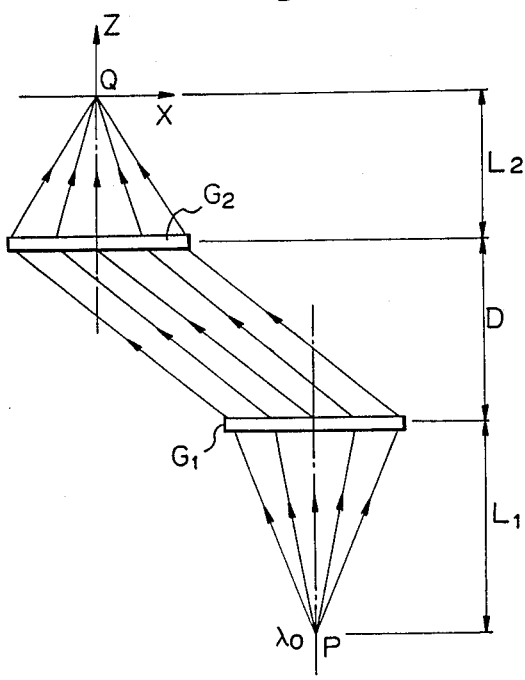
FIG. 78 is a view showing a known grating lens optical system.

In FIG. 78, two off-axis type grating lenses G1 and G2 are located so that their optical axes are offset from each other. The laser beam incident upon the first grating lens G1 from a laser beam source (semiconductor laser) P is diffracted in one direction to a bundle of parallel diffraction rays by the first grating lens G1. Then, the diffraction beam is diffracted in an opposite direction to be converged upon a predetermined point Q. Namely, the beam is diffracted in a zigzag fashion by the two grating lenses to cancel the changes in diffraction angle between the first and second grating lenses, depending on the change of the wavelength of the laser beam. However, in this system shown in FIG. 78, the grating lenses themselves have drawbacks peculiar thereto of the occurrence of abberation and deviation of the focal point, as shown in FIG. 75. Accordingly, it is impossible to compensate for the track deviation (±0.02 μm) and focus deviation (±0.2 μm) for the optical head.

Note that it is possible to compensate for the track deviation by making the distance D between the two grating lenses G1 and G2 substantially zero. However, it is not possible to compensate for a focus deviation within ±0.2 μm (for example, in the case of a 1.8 mm working distance, when the wavelength varies by 1 nm, 6 μm focus deviation takes place).

Under these circumstances, the grating lens system as mentioned above cannot be used as an optical system in an optical head.

The present invention is aimed at the provision of a novel and improved optical system with a grating lens assembly which ensures a good beam spot on a predetermined focal point substantially without any aberration even if the wavelength of the incident light varies and substantially without the deviation of the focal point. The grating lens assembly of the present invention can be incorporated in various optical instruments, such as an optical disk apparatus, a focusing apparatus, or a scanning apparatus.

Figure 1:
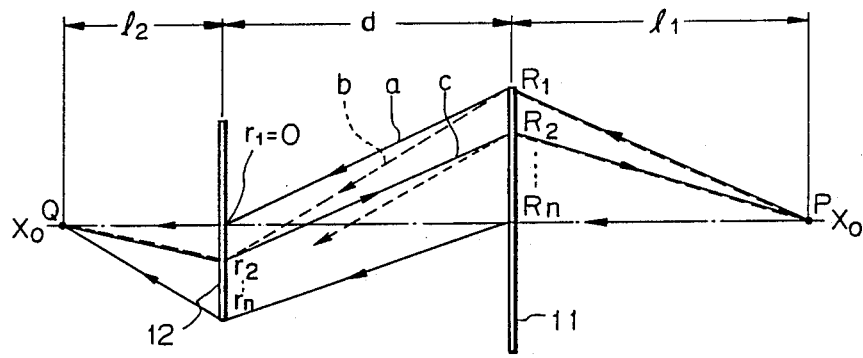
FIG. 1 is a schematic view of a grating lens assembly, showing how to determine spatial frequencies of grating lenses used in the present invention.
Figure 3:
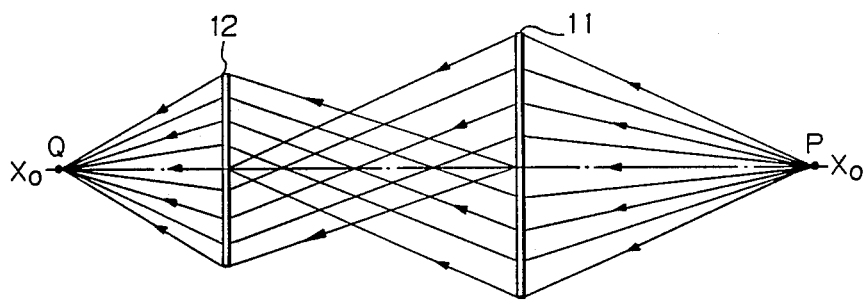
FIG. 3 is a schematic view of a grating lens assembly according to an embodiment of the present invention.

In principle, the grating lens assembly according to the present invention has two in-line grating lenses 11 and 12 spaced from each other at a distance d, as shown in FIGS. 1 and 3.

The first grating lens 11 diffracts the incident light, i.e., a bundle of rays of spherical wave issued from a coherent light source P and incident upon the first grating lens 11, so that the non-parallel diffraction beam intended for use is produced. The second in-line grating lens 12 converges the bundle of non-parallel rays diffracted by the first in-line grating lens 11 upon a predetermined point (or line) Q. The two grating lenses 11 and 12 are located on the same optical axis. Both of the grating lenses 11 and 12 have predetermined spatial frequency distributions in symmetry of revolution with respect to the optical axis. In the embodiment shown in FIG. 3, the first grating lens 11 diffracts the incident light in such a way that the rays of the diffraction beam diffracted at two optional incident points of the first grating lens symmetrical with respect to the optical axis intersect each other on the optical axis.

In the above-mentioned arrangement, supposing optical paths of two beams which have different wavelengths $\lambda_0$, $\lambda$ ($\lambda_0 < \lambda$) and which are incident upon one arbitrary point on the first grating lens 11 from the same direction, the first beam of the wavelength of $\lambda$ is diffracted by the first grating lens at a larger diffraction angle than that of the second beam of the wavelength of $\lambda_0$. The diffraction beams of the first and second beams intersect the optical axis and come to the second grating lens 12. The distance of a point of the second grating lens which the diffraction beam of the wavelength $\lambda$ reaches from the optical axis is larger than that of a point of the second grating lens which the diffraction beam of the wavelength $\lambda_0$ reaches from the optical axis.

The diffraction beams diffracted by the first grating lens are then diffracted again by the second grating lens. When the diffraction of the beams by the second grating lens takes place, the diffraction beam of the wavelength $\lambda$ is diffracted by the second grating lens at a larger diffraction angle than that of the diffraction beam of the wavelength $\lambda_0$. Accordingly, the distance between the two diffraction beams gradually decreases, so that the diffraction beams diffracted by the second grating lens finally come to the same point. Accordingly, by the provision of the two grating lenses each having a predetermined spatial frequency distribution, the point at which the diffraction beams by the second grating lens intersect each other made a predetermined point on the optical axis corresponding to the point Q in FIGS. 1 and 3.

The same is applicable to beams incident upon any point on the first grating lens. When the spatial frequency distributions of the first and second grating lenses are in symmetry of revolution with respect to the optical axis, respectively, the beam of spherical wave incident upon the first grating lens is always converged upon one point on the optical axis, even if the wavelength of the incident beam changes, without aberration and deviation of the focal point.

The discussion will be directed below to how to determine the spatial frequency distribution of the first and second grating lenses, with reference to FIGS. 1 and 2.

In the following description, $l_1$, is the distance between the point (coherent light source) P and the first grating lens 11, d the distance between the two grating lenses, and $l_2$ the distance between the second grating lens 12 and the converging point Q.

(i) First, a beam having the wavelength $\lambda_0$ which is issued from the point P and reaches a point R1 which is located at the outermost circumference of the first grating lens 11 is taken into account. It is supposed that the beam which is diffracted at the point R1 of the first grating lens 11 comes to a point r1 which is a center point of the second grating lens 12. Namely, the distance r of the point r1 from the optical axis is zero (r=0). This beam is represented by the solid line a in FIG. 1. Supposing the optical path P→R1→r1→Q, the spatial frequency F1 and f1 at the points R1 and r1 can be determined.

(ii) Next, supposing that the wavelength is changed from $\lambda_0$ to $\lambda$ ($>\lambda_0$), the beam having the wavelength $\lambda$ which comes to the point R1 from the point P is diffracted at the point R1 with a diffraction angle larger than that of the beam having the wavelength $\lambda_0$ and reaches a point r2 on the second grating lens 12, as shown by a dotted line b in FIG. 1. By the condition that the beam having the wavelength $\lambda$ also converges upon the point Q, a spatial frequency f2 at the point r2 can be determined. (iii) Looking again at the beam of the wavelength $\lambda_0$, it can be determined where a beam which is diffracted at the point r2 and which comes to the point Q comes from, as shown by the solid line c in FIG. 1. Supposing that the point on the first grating lens from which the beam c comes is R2, a spatial frequency F2 at the point R2 can be determined by the condition that the diffraction beam at the point R2 comes to the point P.

(iv) Again, supposing that the wavelength becomes $\lambda$, a point r3 (not shown) on the second grating lens 12 and a spatial frequency f3 at the point r3 can be determined similar to the step (ii) mentioned above. Then, supposing that the wavelength is $\lambda_0$, a point R3 (not shown) on the first grating lens 11 and a spatial frequency F3 at the point R3 can be determined, similarly to the step (iii) as mentioned above. The operations (ii) and (iii) mentioned above are repeated until a point $R_n$ (n=1, 2, 3, ...) on the first grating lens 11 comes to the center of the first grating lens 11, to determine the spatial frequency distribution of the first and second grating lenses 11 and 12 in the radial direction thereof. Note that the diameter of the second grating lens 12 can be determined in accordance with the position of the point $r_n$.

Generally speaking, when $l_2 \geq l_1$, $|r_n| \geq |R_1|$, and when $l_2 < l_1$, $|r_n| < |R_1|$.

By determining the spatial frequency distribution of the grating lenses 11 and 12 in the steps mentioned above, the beam issued from the point P can be always converged to the point Q without aberration, even when the wavelength $\lambda_0$ of the incident beam changes to $\lambda$.

FIG. 2 shows an example of the spatial frequency distributions of the first and second grating lenses 11 and 12 thus obtained.

The spatial frequencies F and f in the radial direction of the first and second grating lenses 11 and 12 were obtained by the calculation wherein $l_1=8$ mm, $d=10$ mm, $l_2=3.4$ mm, $\lambda_0=830$ nm, $\lambda=830.3$ nm. Note that the difference in the wavelengths ($\lambda-\lambda_0=0.3$ nm) corresponds to one mode of the semiconductor laser.

It has been confirmed that the calculation results of the spatial frequencies, with variation of the value $\lambda$ and fixing of $\lambda_0$ to 830 nm ($\lambda_0=830$ nm), were substantially identical to the diagrams shown in FIG. 2, even in the case of $\lambda=\lambda_0\pm5$ nm.

It can be found from FIG. 2 that when the spatial frequency distributions are determined for $\lambda_0=830$ nm and $\lambda=830.3$ nm, neither aberration nor deviation of the focal point occurs for a beam having a wavelength of $\lambda=830\pm5$ nm. By decreasing the distance d further, the same effect can be obtained for a beam having a larger wavelength. For example, when $d=5$ mm, no aberration takes place for a beam having a wavelength of $\lambda=830\pm7$ nm.

Characteristics of the grating lenses 11 and 12 will be clarified below in more detail with reference to FIGS. 4 to 6.

Figure 4:
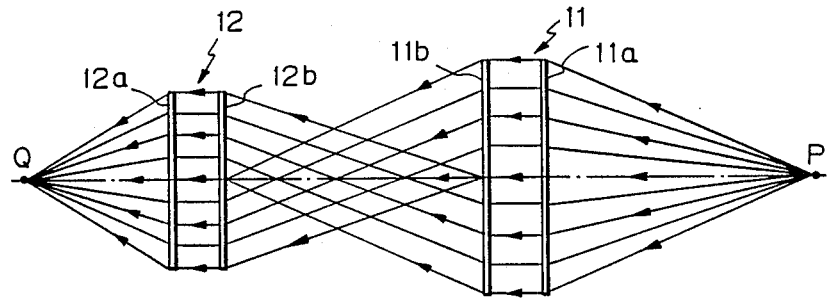
FIG. 4 is a schematic view of a grating lens assembly, from explaining distribution characteristics of spatial frequencies of grating lenses shown in FIG. 1.

As shown in FIG. 4, the grating lenses 11 and 12 are divided into two parts 11a, 11b and 12a, 12b, respectively, for clarification of the diffraction function.

Namely, the grating lenses 11 and 12 are divided into two grating lenses 11a, 11b and 12a, 12b, respectively.

The division of the grating lenses 11 and 12 leads to a division of the spatial frequencies F and f into Fa, Fb and fa, fb, respectively. Note that $F=Fa+Fb$ and $f=fa+fb$. It should be appreciated that the grating lenses 11a and 12a converge a plane wave beam upon a point and accordingly are in-line grating lenses identical to the in-line grating lens of the prior art shown in FIG. 73. On the other hand, the grating lenses 11b and 12b have specific spatial frequency distributions, as shown in FIG. 5, in which the spatial frequencies Fb and fb have maxima (MAX) between the respective lens centers and the outer circumferences of the lenses.

Figure 6:
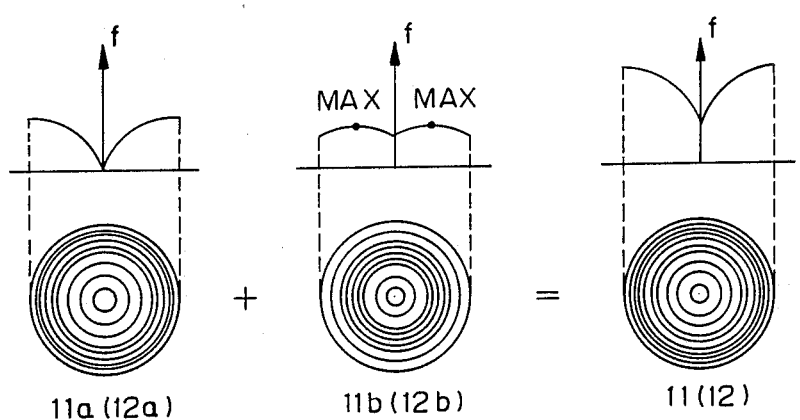
FIG. 6 is a view showing interference fringes of grating lenses according to the distribution of spatial frequencies shown in FIG. 5.

From the foregoing, the characteristics of the grating lenses 11 and 12 can be represented as shown in FIG. 6. Namely, the spatial frequency distributions of the grating lenses 11 and 12 can be represented by the spatial frequency distributions of the in-line grating lenses 11a and 12a for converging the plane wave upon a point plus the spatial frequency distributions of the grating lenses 11b and 12b (the spatial frequency distributions which have maxima between the lens centers and the lens peripheries and which are symmetrical with respect to the axes) as compensating elements.

Figure 7:
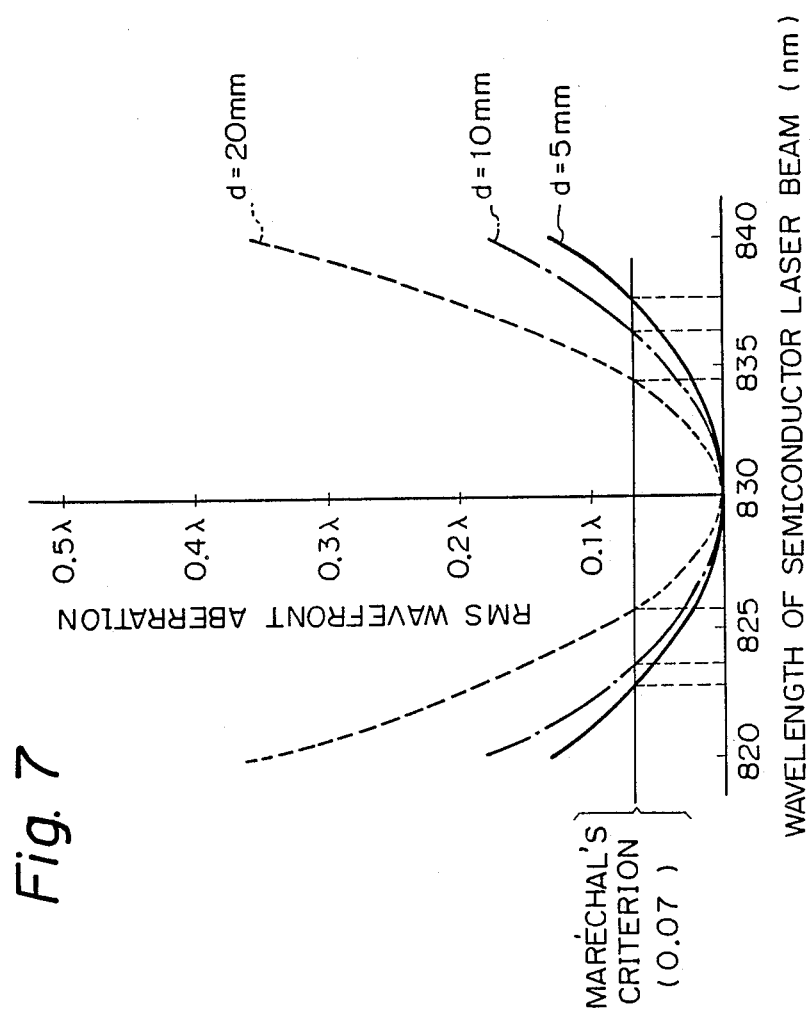
FIG. 7 is a diagram showing a relationship between an RMS wavefront aberration and a wavelength of a semiconductor laser, by way of an example, in the present invention.

FIG. 7 shows the results of calculation which show the compensation effect of the fluctuation of the wavelength of the incident light by the grating lens assembly of the present invention. In FIG. 7, the aberration which occurred when the wavelength of the semiconductor laser beam was changed is represented by the RMS value of wavefront aberration. In the calculation, $l_1=8$ mm, $l_2=3.4$ mm, $d=5, 10, 20$ mm, and the wavelength was started from 830 nm. Also, in the calculation, the wavelengths of the grating lenses 11 and 12 were designed in such a way that the grating lenses do not substantially cause aberration when the wavelengths are 830 nm and 830.3 nm, respectively.

In FIG. 7, assuming Marechal's Criterion (RMS wavefront aberration $\lesssim 0.07\ \lambda$), which can be considered a reference value where it is deemed substantially no aberration occurs in practice, an allowable range of fluctuation of wavelength can be obtained. It can be found from FIG. 7 that the allowable ranges are at least $830\pm7$ nm, $830\pm6$ nm, and $830\pm4$ nm, when $d=5$ mm, $d=10$ mm, and $d=20$ mm, respectively. Thus, when the fluctuation of the wavelengths is within the allowable ranges, a good beam spot can be obtained without aberration. It has been also confirmed that no deviation of the focal point occurred in the calculation mentioned above.

As can be seen from the calculation results, according to the embodiment shown in FIGS. 1 and 2, the fluctuation of the wavelength can be effectively absorbed and has no influence on the quality of the beam spot and focus. Namely, according to the present invention, when the wavelength of the semiconductor laser beam, even of the multimode laser beam, changes, and even when the mode-hop occurs, a good quality beam spot can be substantially always obtained without aberration and without deviation of the focal point. Accordingly, an optical system, such as an optical head having a grating lens assembly, can be realized in practice.

It should be appreciated that when the output beam intensity of the semiconductor laser has a Gaussian distribution, the converged beam also has a Gaussian distribution in the conventional optical lens system, but in the present invention, the converged beam has a relatively uniform distribution of the output beam intensity. Thus, a very tiny beam spot can be advantageously obtained.

The grating lenses 11 and 12 of the present invention can be manufactured, for example, by an electron beam writing method, which is per se known. In the electron beam writing process, the calculation results of the spatial frequencies of the grating lenses 11 and 12 are input in a computer as data, so that desired grating lenses can be obtained.

It is possible, as is well known, to blaze the grating lenses to make blazed grating lenses in order to enhance the efficiency of the grating lenses. Furthermore, it is also possible to produce the grating lenses in a holographic process by creating a desired wavefront with the use of optical elements. In this alternative, it is possible to increase the efficiency of the grating lenses by decreasing the distance d between the two grating lenses to make the spatial frequency band higher.

It is possible to actually use four grating lenses 11a, 11b and 12a, 12b in place of two grating lenses 11 and 12, in the above-mentioned embodiments.

Figure 8:
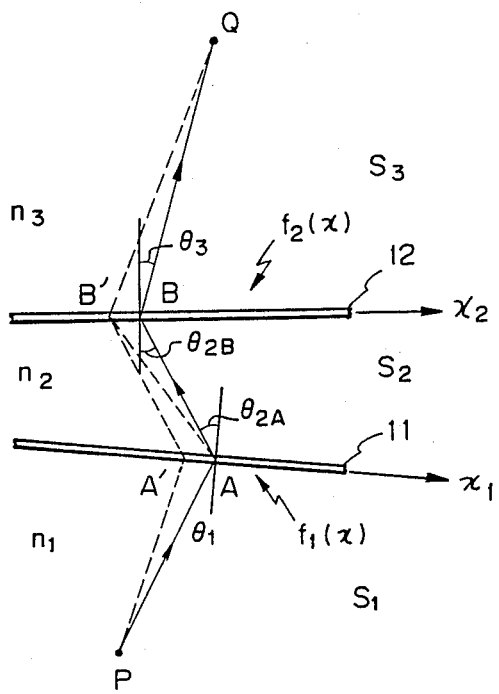
FIG. 8 is a schematic view showing a principle of a grating lens assembly according to the present invention.

FIG. 8 shows a general theoretical principle of the grating lens assembly according to the present invention. For simplification, first, a one-dimensional construction will be analyzed below.

In FIG. 8, the first grating lens (hologram lens) 11 which has a spatial frequency f1(x1, x2) and a second grating lens (hologram lens) 12 which has a spatial frequency f2(x1, x2) are located between a beam issuing point (light source) P and a beam converging point Q. The grating lenses 11 and 12 define three sections S1, S2, and S3. The abscissae x1 and x2 extend in the plane of the first and second grating lenses 11 and 12, respectively.

Supposing that a beam of wavelength λ which passes through the grating lenses 11 and 12, intersects the grating lenses 11 and 12 at points A and B, respectively, optical paths $\overline{PA}$, $\overline{AB}$ and $\overline{BQ}$ can be determined. The total optical path $\phi$ can be given by the following equation:

$$\phi = \phi_1 + \phi_2 + \phi_3 \qquad (1)$$

wherein
$\phi_1 = \overline{PA} \cdot n_1 = \phi_1(x_1)$
$\phi_2 = \overline{AB} \cdot n_2 = \phi_2(x_1, x_2)$
$\phi_3 = \overline{BQ}.19 \, n_3 = \phi_3(x_2)$
$n_1$, $n_2$ and $n_3$ are refractive indices of the sections S1, S2, and S3, respectively.

The spatial frequencies f1(x1, x2) and f2(x1, x2) can be obtained by the following equations ② and ② which can be in turn obtained by differentiating the optical paths mentioned above.

$$f_1(x_1, x_2)\lambda = g_1(x_1) + g_{2A}(x_1, x_2) \qquad (2)$$

$$f_2(x_1, x_2)\lambda = g_{2B}(x_1, x_2) + g_3(x_2) \qquad (3)$$

$$g_1(x_1) = \delta\phi_1/\delta x_1 = \sin\theta_1 \qquad (4)$$

$$g_3(x_2) = \delta\phi_3/\delta x_2 = \sin\theta_3 \qquad (5)$$

$$g_{2A}(x_1, x_2) = \delta\phi_2/\delta x_1 = \sin\theta_{2A} \qquad (6)$$

$$g_{2B}(x_1, x_2) = \delta\phi_2/\delta x_2 = \sin\theta_{2B} \qquad (7)$$

wherein, $\theta_1$ and $\theta_{2A}$ are the incident angle and diffraction angle of the first grating lens 11, and $\theta_{2B}$ and $\theta_3$ are the incident angle and diffraction angle of the second grating lens 12. The sign of angle $\theta$ is positive when viewed in a clockwise direction and the sign of the spatial frequency f is positive when it functions to diffract the beam in the counterclockwise direction.

If the wavelength changes by $\Delta\lambda$, the beam of the wavelength of $(\lambda + \Delta\lambda)$ which is diffracted by the first grating lens 11 comes to a point B' $(x_2 + \Delta x_2)$ on the second grating lens 12. From the equation ②, $$f_1(x_1, x_2)\Delta\lambda = \{\delta g_{2A}(x_1, x_2)/\delta x_2\}\Delta x_2 \qquad (8)$$

If there is no change of the point Q by the change of the wavelength from $\lambda$ to $(\lambda + \Delta\lambda)$, we have the following equation from the equation ③.

$$\Delta f_2(x_1, x_2)\lambda + f_2(x_1, x_2)\Delta\lambda = \{\delta g_3(x_2)/\delta x_2 + \delta g_{2B}(x_1, x_2)/\delta x_2\}\Delta x_2 \qquad (9)$$

wherein the small variation of $\Delta f_2(x_1, x_2) \cdot \Delta\lambda$ was ignored.

On the other hand, since the beam of the wavelength $\lambda$ which passes through the second grating lens 12 at the point B' from the point Q passes through the first grating lens 11 at a point A' on the first grating lens 11 and comes to the point P, the point A' may be assumed to be represented by $(x_1 + \Delta x_1)$. From this, $$\Delta f_2(x_1, x_2)\lambda = \{\delta g_3(x_2)/\delta x_2 + \delta g_{2b}(x_1, x_2)/\delta x_2\}\Delta x_2 + \{\delta g_{2b}(x_1, x_2)/\delta x_1\}\Delta x_1 \qquad (10)$$

From the equations ⑨ and ⑩, the following equation ⑪ can be obtained:

$$f_2(x_1, x_2)\Delta\lambda = -\{\delta g_{2B}(x_1, x_2)/\delta x_1\}\Delta x_1 \qquad 11$$

By eliminating $\Delta\lambda$ from the equations ⑧ and ⑪, $$f_1(x_1, x_2)\{\delta g_{2B}(x_1, x_2)/\delta x_1\}\Delta x_1 + f_2(x_1, x_2)\{\delta g_{2A}(x_1, x_2)/\delta x_2\}\Delta x_2 = 0 \qquad (12)$$

or, $$\{g_1(x_1) + g_{2A}(x_1, x_2)\} \times \{\delta g_{2B}(x_1, x_2)/\delta x_1\}\Delta x_1 + \{g_{2B}(x_1, x_2) + g_3(x_2)\} \times \{\delta g_{2A}(x_1, x_2)/\delta x_2\}\Delta x_2 = 0 \qquad (13)$$

Since the following relationship given by ⑭ is generally established from the equations ⑥ and ⑦, $$\delta g_{2A}(x_1, x_2)/\delta x_2 = \delta^2\phi_2/\delta x_1\delta x_2 = \delta g_{2B}(x_1, x_2)/\delta x_1 \qquad (14)$$

the equation ⑬ can be replaced with the following equation:

$$\Delta\phi = (\delta\phi_1/\delta x_1 + \delta\phi_2/\delta x_1)\Delta x_1 + (\delta\phi_2/\delta x_2 + \delta\phi_3/\delta x_2)\Delta x_2 = 0 \qquad (15)$$

Therefore, we conclude that:
$$\phi = \text{const.} \qquad (16)$$

From this, we have the basic principle that when the optical path is constant, a grating lens assembly which is not sensitive to a change of the wavelength, that is, which is free from the fluctuation of the wavelength, can be obtained.

In the case of a two-dimensional construction, the above basic principle that when the optical path is constant, a grating lens assembly which is free from fluctuation of the wavelength can be obtained, is concluded by the following:

Namely, for a two-dimensional construction, the optical paths can be represented by the following equations ①' in place of the equation ①.

$$\phi = \phi_1 + \phi_2 + \phi_3 \qquad (1)'$$

wherein,
$\phi_1 = \overline{PA} \cdot n_1 = \phi_1(x_1, y_1)$
$\phi_2 = \overline{AB} \cdot n_2 = \phi_2(x_1, x_2, y_1, y_2)$
$\phi_3 = \overline{BQ} \cdot n_3 = \phi_3(x_2, y_2)$ With respect to the analysis following equation ①, calculations similar to those for the x-component mentioned above can be effected for the y-component of an x-y coordinate.

To further standardize the relationship represented by the equations ④ to ⑦, small surfaces at the points A and B which are represented by coordinates (x1, y1) and (x2, y2), respectively are taken into consideration, so that the following equations can be obtained.

$$\begin{aligned}
\delta\phi_1/\delta x_1 &= \cos\alpha_1 = l_1 \\
\delta\phi_3/\delta x_2 &= \cos\alpha_3 = l_3 \\
\delta\phi_2/\delta x_1 &= \cos\alpha_{2A} = l_{2A} \\
\delta\phi_2/\delta x_2 &= \cos\alpha_{2B} = l_{2B} \\
\delta\phi_1/\delta y_1 &= \cos\beta_1 = m_1 \\
\delta\phi_3/\delta y_2 &= \cos\beta_3 = m_3 \\
\delta\phi_2/\delta y_1 &= \cos\beta_{2A} = m_{2A} \\
\delta\phi_2/\delta y_2 &= \cos\beta_{2B} = m_{2B}
\end{aligned} \qquad (18)$$

wherein 1, m and n are direction cosine's of the respective small surfaces. In conclusion, similar to one-dimensional construction mentioned above, FIGS. 9 and 10 show another embodiment of the present invention, in which the incident beam of spherical wave from the point P in FIG. 1 is replaced with a coherent incident beam of a plane wave. The arrangement shown in FIG. 9 is quite the same as that of FIG. 3 except that the coherent incident light of a bundle of parallel rays of a plane wave is incident upon the first in-line grating lens 11.

Figure 10:
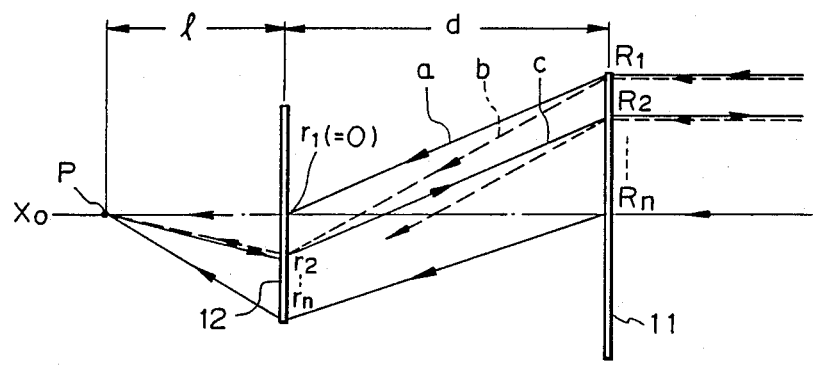
FIG. 10 is a view similar to FIG. 1, showing how to determine spatial frequencies of grating lenses shown in FIG. 9.
Figure 11:
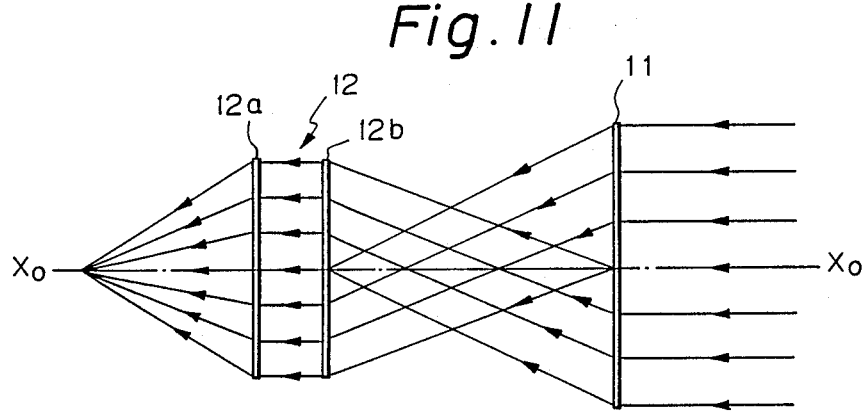
FIG. 11 is a view similar to FIG. 4, for grating lenses shown in FIG. 10.

FIGS. 10 and 11 correspond to FIGS. 1 and 4 of the aforementioned embodiment. Since the same discussion given for FIGS. 1 and 4 are applicable to FIGS. 10 and 11, the explanation for FIGS. 10 and 11 is omitted herein.

Note that in FIG. 11, the first grating lens 11 diffracts the incident light of a bundle of parallel rays, as mentioned above. Accordingly, it is meaningless to analyze the first grating lens by dividing it into two grating lens as shown in FIG. 4.

Figure 9:
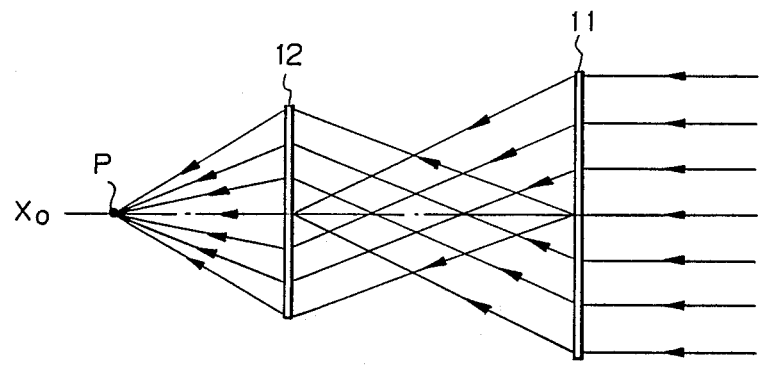
FIG. 9 is a view similar to FIG. 3, but showing another embodiment of a grating lens assembly.
Figure 12:
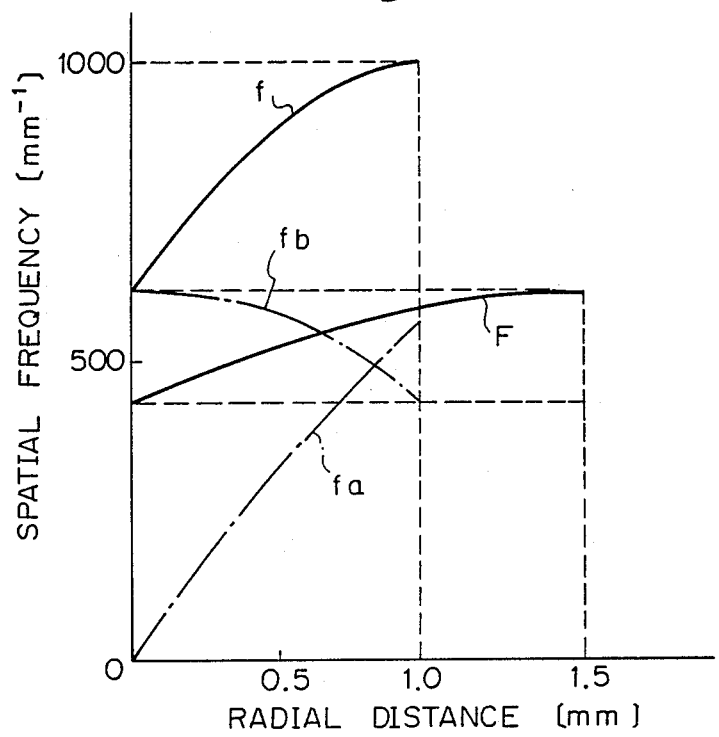
FIG. 12 is a diagram showing an example of a distribution of spatial frequencies of grating lenses shown in FIG. 11.

FIG. 12 shows examples of the spatial frequency of the grating lenses 11 and 12 shown in FIG. 9.

In FIG. 12, the radii R and r of the first and second grating lenses 11 and 12 were 1.5 mm and 0.95 mm (R=1.5 mm, r=0.95 mm), the distance (focal length of the second grating lens) between the point Q and the second grating lens 12 was 1.8 mm (l=1.8 mm), and the distance d between the first and second grating lenses was 2.5 mm (d=2.5 mm). The wavelength $\lambda_0$ of the incident beam at which the grating lens 12 can converge the beam upon the point (focal point) Q without aberration was 830 nm ($\lambda_0$=830 nm).

As can be seen from FIG. 12, the spatial frequency distributions F and f of the first and second grating lenses 11 and 12 present smooth curves which increase from the lens centers to the lens peripheries. The grating lens 12a of the second grating lens 12 which can be equivalently divided into two grating lenses, as explained before with reference to FIG. 4, has a spatial frequency distribution fa in which the spatial frequency is zero at the lens center and substantially linearly increases toward the lens periphery thereof. The spatial frequency distribution fb of the other grating lens 12b has a frequency band identical to the frequency band of the first grating lens 11 covering 430 to 620 mm$^{-1}$ and is such that the spatial frequency smoothly decreases from the lens center toward the lens periphery. In the second grating lens 12, the following relationship can be established as mentioned before: f=fa+fb.

Figure 13:
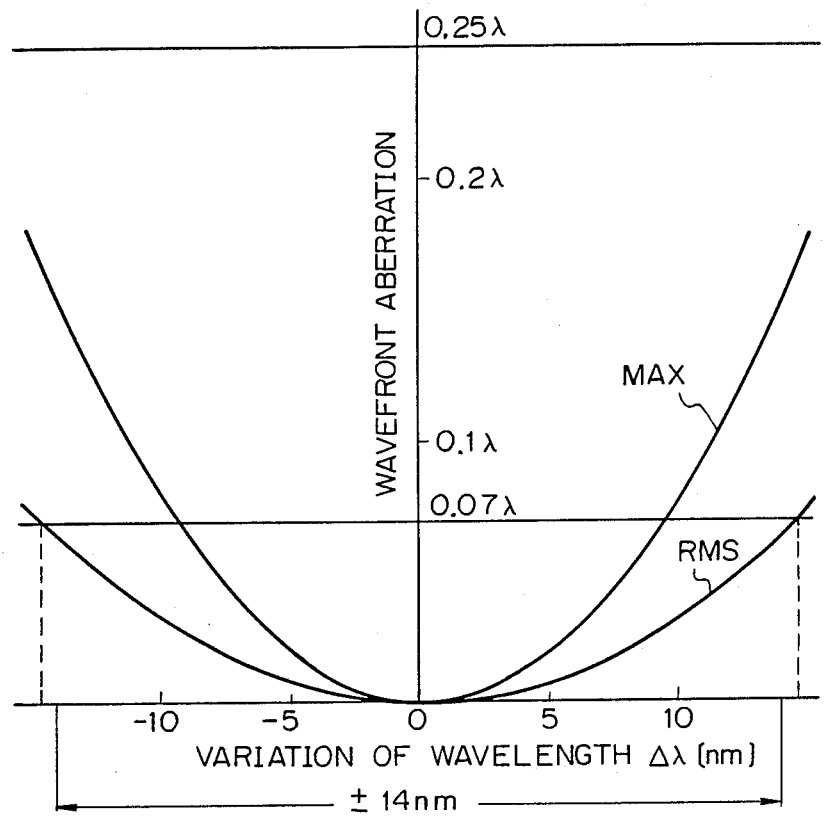
FIG. 13 is a diagram showing a relationship between an RMS wavefront aberration and a deviation of wavelength.

To confirm the compensation effect of the fluctuation of the wavelength by the grating lenses according to the embodiment shown in FIGS. 9 to 11 mentioned above, we calculated the RMS values and the maxima of the wavefront aberration which are caused when the wavelength of the incident beam is changed from the center wavelength 830 nm by a variation $\Delta\lambda$. The results are shown in FIG. 13. The grating lenses 11 and 12 were designed so that they have the spatial frequency distributions in which no aberration takes place when the wavelengths are 830 nm and 830.3 nm, by the process shown in FIG. 10.

In FIG. 13, from the condition that when the RMS value is below 0.07 $\lambda$ and the MAX value is below 0.25 $\lambda$ (RMS<0.07 $\lambda$, MAX<0.25 $\lambda$), it can be deemed that no aberration practically takes place, it can be found that no aberration can be maintained for the wavelength of 830±14 nm. The range of the wavelength of 830±14 nm can cover the wavelengths (including the fluctuation of the wavelength due to change of temperature) of the laser beam of almost all of the semiconductor lasers presently available on the market. It has been also confirmed in FIG. 13 that there was no deviation of the focal point.

Figure 14:
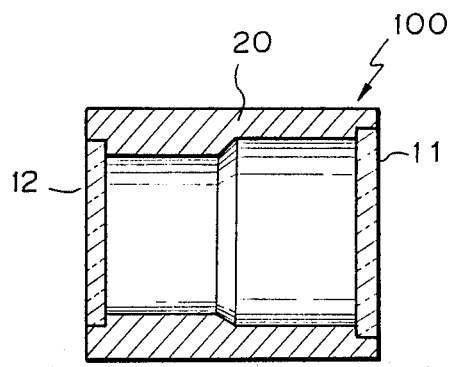
FIG. 14 is a sectional view of a construction of a grating lens assembly according to the present invention.

FIG. 14 shows an example of a grating lens assembly which can be easily integrally constructed. In FIG. 14, the first and second grating lenses 11 and 12 are attached to opposite ends of a cylindrical housing 20, so that the grating lenses are coaxial to the optical axis.

Figure 15:
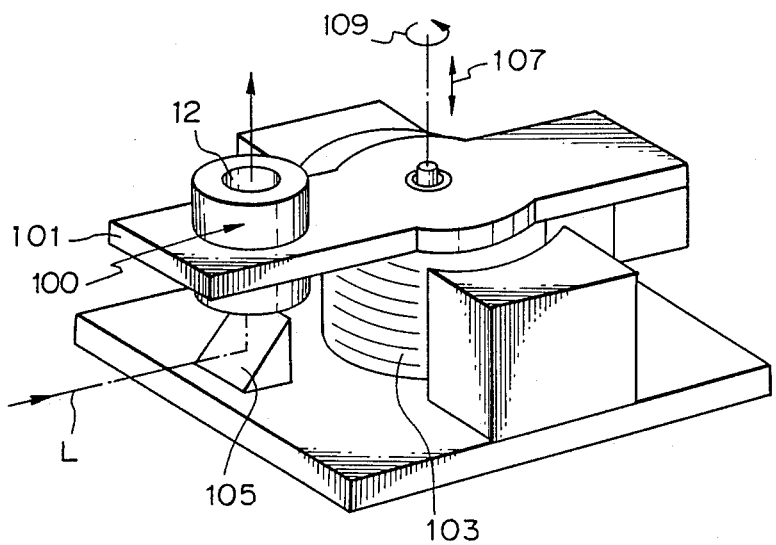
FIG. 15 is a perspective view of an optical pickup having a grating lens assembly shown in FIG. 14 incorporated therein.

FIG. 15 shows an example of an optical pickup which has the grating lens assembly 100 shown in FIG. 14. In a pickup shown in FIG. 14, the grating lens assembly 100 is incorporated as an objective in an actuator 101 which is in turn connected to a rotary bobbin 103, so that the actuator 101 can move in the axial direction 107 and rotate in the direction 109 to perform focusing and tracking operations, as is well known. The pickup per se shown in FIG. 15 is a typical known pickup except for the objective, which is formed by the grating lens of the present invention as mentioned above. The collimated beam L, for example, from a semiconductor laser (not shown) is reflected upward by a mirror 105 to be incident upon the grating lens assembly 100, where the incident beam is converged upon a point, for example, on an optical disk (optical recording medium), not shown. In this optical pickup, if the wavelength of the semiconductor laser beam L fluctuates, for example, due to change of temperature, the fluctuation does not substantially have an adverse influence on the beam spot converged upon the optical disk, because of the compensation effect by the grating lens assembly according to the present invention. The pickup shown in FIG. 15 is lighter, smaller, and less expensive, since the grating lens assembly of the present invention can realize a lighter, smaller, and less expensive objective compared to a conventional objective made of normal optical lenses.

Figure 16:
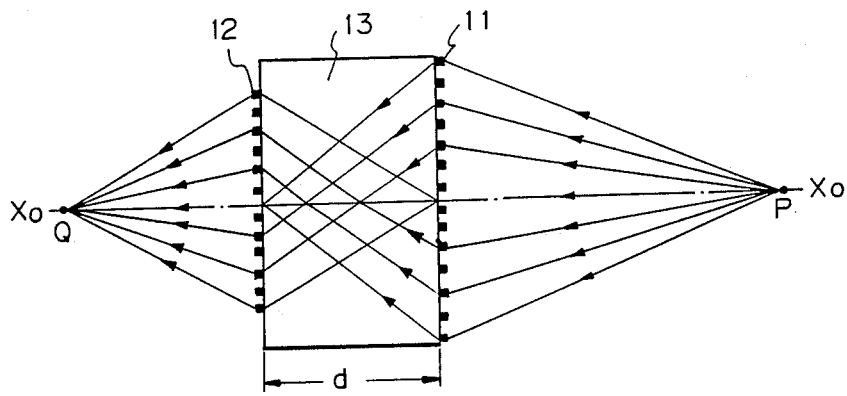
FIG. 16 is a schematic view of a grating lens assembly according to another aspect of the present invention.

FIG. 16 shows a different embodiment of a grating lens according to the present invention. In FIG. 16, the first and second grating lenses 11 and 12 are formed on opposite sides of a transparent body 13 which has a thickness d and which can be made of, for example, a parallel glass plate. Namely, the embodiment shown in FIG. 16 is characterized by the provision of the transparent body 13 between the first and the second grating lenses 11 and 12, unlike the aforementioned embodiments in which the grating lenses are spaced from one another at a distance d.

According to the embodiment shown in FIG. 16, since the grating lenses 11 and 12 are integrally secured to the parallel opposite side faces of the transparent body 13, there is no accidental relative displacement between the first and second grating lenses 11 and 12. Furthermore, according to the embodiment shown in FIG. 16, in which the transparent body 13 is provided between the grating lenses 11 and 12, it is possible to increase an average spatial frequency of the first and second grating lenses 11 and 12 in order to increase an efficiency of light without the need for blazing of the grating lenses, in comparison with the aforementioned embodiments in which the grating lenses are spaced. This leads to an increased of range of wavelength in which the fluctuation of the wavelength can be compensated.

According to the arrangement shown in FIG. 16, the grating lens assembly can be easily made integral with a semiconductor laser LD, since the grating lenses are integral with the transparent body 13 so as to be coaxial to the optical axis.

Figure 17:
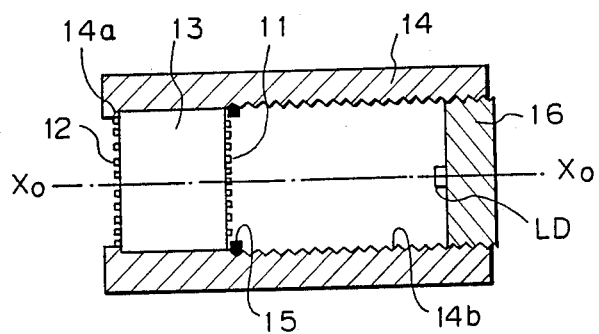
FIG. 17 is a sectional view of a module for converging the semiconductor laser using a grating lens assembly shown in FIG. 16.
Figure 18:
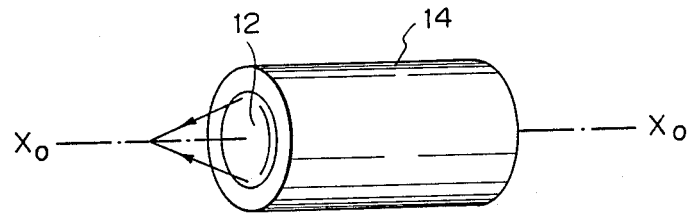
FIG. 18 is a perspective view of a module shown in FIG. 17.

FIGS. 17 and 18 show an example of a semiconductor laser beam converging module which has the grating lens assembly shown in FIG. 16 integral with a semiconductor laser LD. In FIGS. 17 and 18, the transparent body 13, which is provided on its opposite side faces with the grating lenses 11 and 12 integral therewith, is fitted in a cylindrical housing 14 so as to abut against an inner annular flange 14a of the housing 14. The grating lens assembly having the transparent body 13 and the grating lenses 11 and 12 is secured to and in the cylindrical housing 14 by an annular screw 15 which is screwed in a threaded bore 14b of the housing 14. The semiconductor laser LD is provided on a mount 16 which has a threaded outer periphery which is screwed in the threaded bore 14b of the housing 14. The mount 16 also serves as a heatsink. The laser LD is attached to the center of the cylindrical annular mount 16, so that the axial position of the LD, namely the distance between the point P and the first grating lens 11 corresponding to $l_1$ in FIG. 1, can be easily adjusted by adjusting the axial screw movement of the mount 16. The module shown in FIGS. 17 and 18 is, for example, practically 6 mm$\phi$×10 mm, which is very compact.

Figure 19:
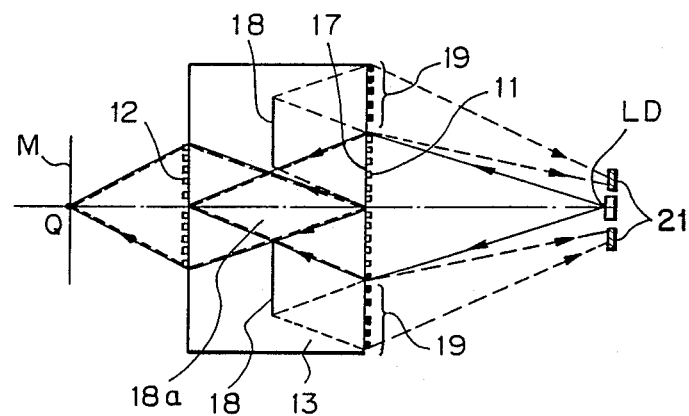
FIG. 19 is a schematic view of an optical pickup according to another aspect of the present invention.

FIG. 19 shows an example of an application of the grating lens assembly of the present invention to an optical pickup. The illustrated pickup has the grating lens assembly having the transparent body 13 and the grating lenses 11 and 12 provided on the transparent body 13, a half mirror 17, an annular mirror 18, and a third grating lens 19. The half mirror 17 is provided between the first grating lens 11 and the transparent body 13 and has an optimum transmittance which is determined by taking the necessary intensity of light at the focal point Q and the amount of light to be returned to the laser LD into consideration.

The mirror 18 is embedded in the transparent body 13 between the first and second grating lenses 11 and 12, so that a center opening 18a of the annular mirror 18 is located coaxial to the optical axis. The diffraction beam between the first and second grating lenses 11 and 12 passes through the center opening 18a of the annular mirror 18. The face of the mirror 18 that is located adjacent to the half mirror 17 is an annular mirror surface. The third grating lens 19 surrounds the first grating lens 11 and lies on the same plane of the first grating lens. The third grating lens 19 has a spatial frequency distribution which converges the beam in symmetry of revolution with respect to the optical axis.

With this arrangement, the laser beam from the LD is converged upon the focal point Q on the optical disk (recording medium) M through the first grating lens 11, the transparent body 13, and the second grating lens 12, as mentioned before.

The beam reflected from the disk M at the point Q, i.e., a signal beam, returns along the same optical path as that of the incident beam in the opposite direction. Namely, the signal beam passes through the second grating lens 13 and through the center opening 18a of the mirror 18 and comes to the first grating lens 11. It should be noted here that in the return path, a part of the signal beam is reflected by the half mirror 17. The part of the signal beam which is reflected by the half mirror is diffused far from the optical axis, is reflected again by the annular mirror 18, and comes to the area outside the outer periphery of the first grating lens 11, in which area the third grating lens 19 is provided, as mentioned above. The signal beam which reaches the third grating lens 19 is accordingly diffracted thereby in symmetry of revolution with respect to the optical axis, so that the signal beam diffracted by the third grating lens 19 is converged upon a focal point where a photodetector 21 is located. The photodetector 21, which is per se known, has an annular light receiving surface surrounding the LD so as to effectively receive the signal beam converged by the third grating lens 19.

As can be seen from the foregoing, the signal beam from the optical disk M is brought to the photodetector 21 through the second and third grating lenses 12 and 19. It should be appreciated that when the signal beam is diffracted by the second and third grating lenses 12 and 19, the fluctuation of the wavelength can be compensated, for similarly to the grating lens assembly of the first and second grating lenses 11 and 12 mentioned before. Namely, the assembly of the second and third grating lenses 12 and 19 forms a grating lens assembly equivalent to the grating lens assembly having the first and second grating lenses 11 and 12, not sensitive to the fluctuation of the wavelength. Thus, the beam spot converged upon the photodetector 21 is substantially free from aberration and deviation of the focal point.

Figure 20:
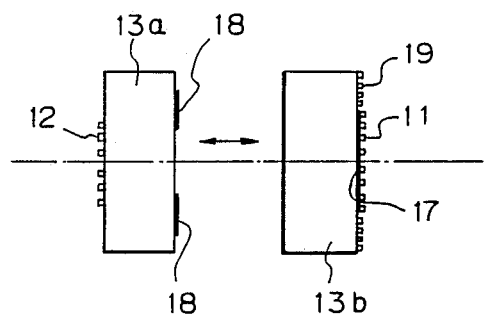
FIG. 20 is an explanatory view showing how to embed a mirror in a transparent body shown in FIG. 19.

The half mirror 17 can be formed by a known aluminum deposition processor or the like prior to he formation of the first grating lens 11 on the transparent body 13. The annular mirror 18 can be provided in the transparent body 13 in such a way that the transparent body 13 is made of two transparent bodies 13a and 13b which can be adhered to each other. A mirror surface is formed, for example, by Al-deposition, which is per se known, or the like on the side face of one transparent body 13a or 13b that is to be adhered to the other transparent body 13b or 13a, before the two transparent bodies 13a and 13b are adhered to each other, as shown in FIG. 20. Preferably, the adhesive which adheres the two transparent bodies 13a and 13b has a refractive index which is substantially identical to that of the transparent body 13 when it is cured or hardened. One example of such an adhesive is a UV (ultraviolet radiation) curable adhesive.

Figure 21:
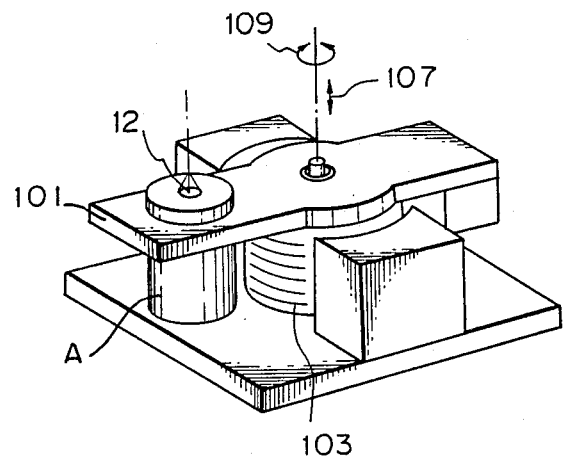
FIG. 21 is a perspective view of an optical pickup having a grating lens assembly shown in FIG. 19.

FIG. 21 shows an example of an optical pickup which has the optical system shown in FIG. 19 incorporated therein, similar to the optical pickup shown in FIG. 15. In FIG. 21, components corresponding to those shown in FIG. 15 are designated with the same numerals. No additional explanation will be given here on these. Note that, in FIG. 21, the mirror 105 shown in FIG. 15 is removed since a spherical wave beam is incident upon the grating lens assembly in FIG. 21, unlike the arrangement shown in FIG. 15, in which a parallel plane wave beam is incident upon the grating lens assembly.

Figure 22:
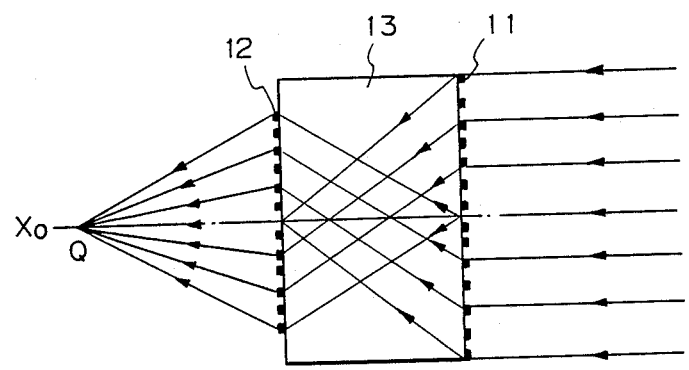
FIG. 22 is a schematic view of a grating lens assembly, according to still another aspect of the present invention.

FIG. 22 shows a modification of FIG. 16. In FIG. 22, a parallel plane wave beam (coherent light) is incident upon the first grating lens 11, unlike the arrangement shown in FIG. 16, in which a spherical wave beam is incident upon the first grating lens 11.

The relationship between FIGS. 16 and 22 corresponds to the relationship between FIGS. 3 and 9 mentioned above.

Figure 23:
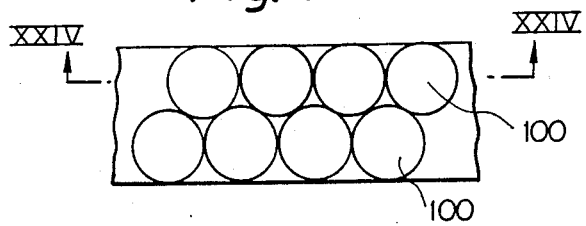
FIG. 23 is a plan view of an array of grating lenses using a grating lens assembly shown in FIG. 16.
Figure 24:
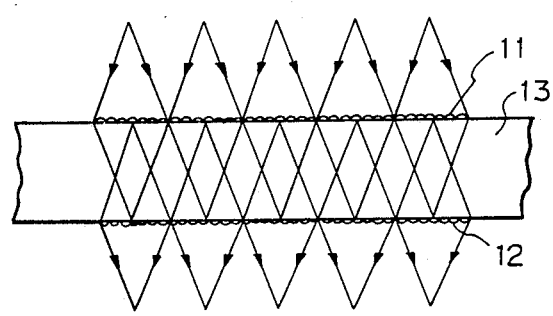
FIG. 24 is a sectional view taken along the line XXIV—XXIV in FIG. 23.

In an alternative, it is also possible to provide more than one pair of grating lenses 11 and 12 in a one-dimensional or two-dimensional arrangement. One example of such multiple grating lens assemblies is shown in FIGS. 23 and 24, in which a plurality of grating lens assemblies 100 are located in an array arrangement.

Each grating lens assembly 100 corresponds to a module, for example, as shown in FIGS. 3, 9, 16, or 22.

Figure 79:
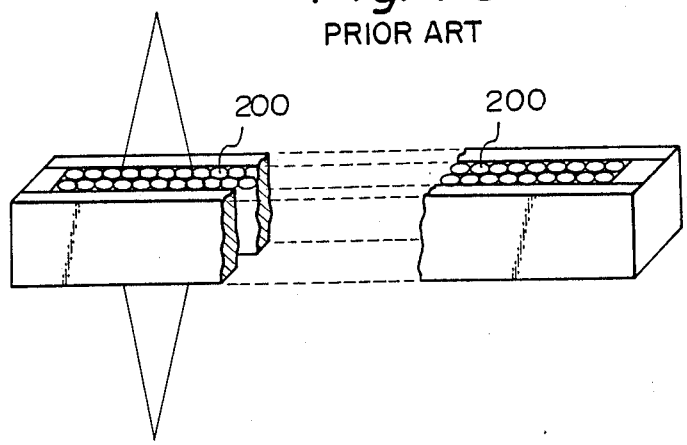
FIG. 79 is a perspective view of a known rod lens array.
Figure 80:
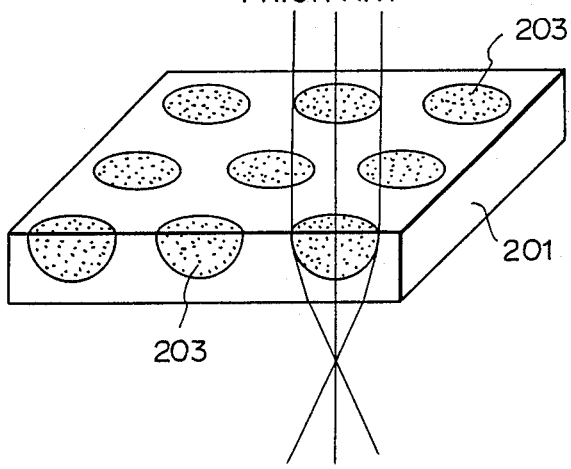
FIG. 80 is an explanatory perspective view of a known distributed index lens array.

For comparison, FIG. 79 shows a known rod lens array which has an array of a plurality of rod lenses 200, and FIG. 80 shows a known distributed index lens array in which a substrate 201 has spherical index distributions 203 therein to form a lens. However, in the rod lens array shown in FIG. 79, there are drawbacks that the length of the rod lenses is about 8 mm, which is rather long, and that the rod lens array is very expensive.

On the other hand, although the distributed index lens array can be thinner than the rod lens array, it can only have a small numerical aperture (NA) of about 0.3 and aberration takes place due to the fluctuation of the wavelength.

On the contrary, the grating lens array shown in FIGS. 23 and 24 can have an increased density due to the fact that the diameter of the lenses can be made smaller, resulting in improved resolution. In addition thereto, it is possible to have a large numerical aperture (NA) of more than 0.5 in order to produce a very small beam spot. Furthermore, according to the grating lens array shown in FIGS. 23 and 24, since there is only a small chromatic aberration (up to ±20 nm) due to the wavelength, not only the semiconductor laser but also an LED (light-emitting diode), which usually has a wavelength half-width of 20 to 40 nm, can be used as a light source.

Figure 25:
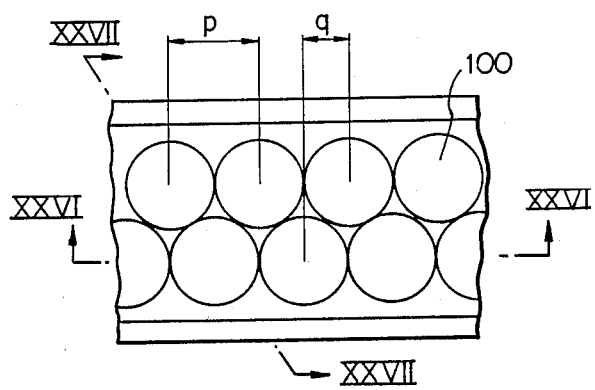
FIG. 25 is a plan view of a lens array for an LED array using a grating lens assembly shown in FIG. 16.
Figure 26:
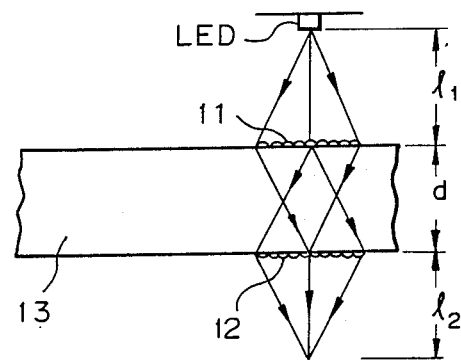
FIG. 26 is a sectional view taken along the line XXVI—XXVI in FIG. 25.
Figure 27:
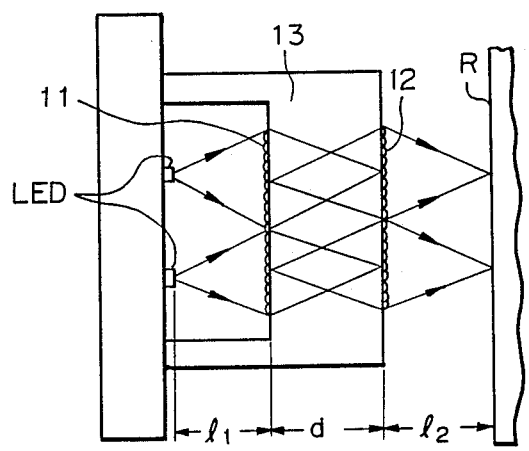
FIG. 27 is a sectional view taken along the line XXVII—XXVII in FIG. 25.

FIGS. 25 to 27 show an example of an application of the grating lens array mentioned above to a lens array for an LED array, which can be used, for example, in facsimiles or printers. In FIGS. 25 to 27, the grating lens assemblies are located in a zigzag arrangement to form a grating lens array. The array has LED's which correspond to the grating lens assemblies. Each LED has, for example, a wavelength half-width of about 30 nm. In this construction, a lens pitch p and effective pitch q can be decreased to be, for example, 170 $\mu$m and 85 $\mu$m, respectively (p=170 $\mu$m, q=85 $\mu$m).

The effective pitch q can be further decreased by increasing the number of lines of the grating lens assemblies.

In one example, $l_1$ (the distance between the LED's and the first grating lenses of the corresponding grating lens assemblies)=200 $\mu$m, d (the distance between the first and second grating lenses 11 and 12)=400 $\mu$m, and $l_2$ (the distance between the second grating lenses 12 and the surface R of a recording medium (e.g., electrostatic drum) on which the beam is to be focused) can be properly determined in accordance with the resolution. For instance, $l_2 \approx 200$ $\mu$m in the case of a beam spot having a 2 to 3 $\mu$m diameter and $l_2 \approx 2000$ $\mu$m in the case of a beam spot having 20 to 30 $\mu$m diameter.

The grating lens array shown in FIGS. 25 to 27 can be made by shape duplication by using a plastic substrate. Namely, grating lens patterns of the first and second grating lenses 11 and 12 are printed in accordance with the dimensions as mentioned above, by electron beam writing and then Ni stampers are formed from resist patterns thus obtained by the grating patterns by a conventional method. Finally, the plastic substrate is subject to injection to duplicate the grating lens array.

The lens array thus formed can have a large numerical aperture (NA) and accordingly an efficiency of collection of the LED beam can be increased and printing with high resolution can be effected due to a decreased diameter of the beam spot.

Figure 28:
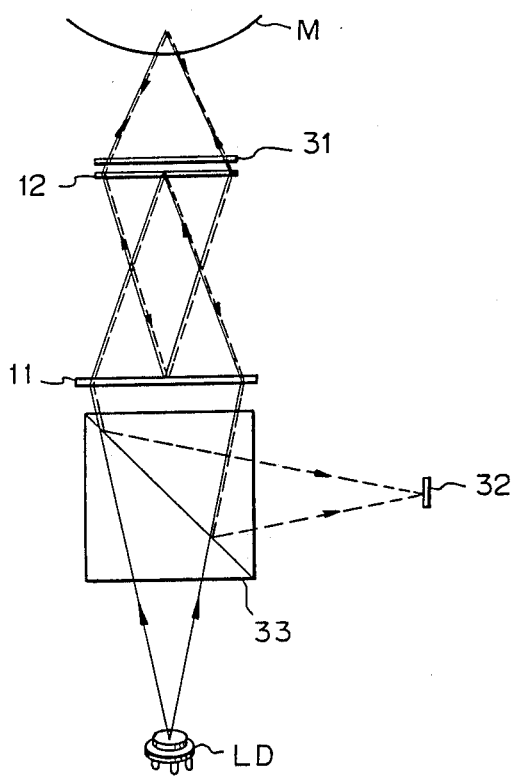
FIG. 28 is a schematic view of an optical pickup according to an embodiment of the present invention.

FIG. 28 shows an optical pickup according to another aspect of the present invention.

Before we discuss the pickup shown in FIG. 28, a discussion will be made on the prior art shown in FIG. 81 for comparison's sake.

Figure 81:
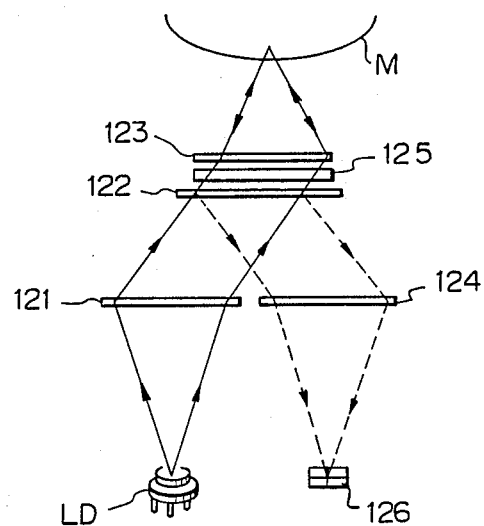
FIG. 81 is a view of a known optical pickup.

Japanese Unexamined Patent Publication (Kokai) No. 59-160166 discloses the arrangement shown in FIG. 81, in which the spherical wave beam (e.g., P-polarized light) issued from the semiconductor laser LD is diffracted by the holographic lens (which will be referred to as a hologram) 121, and the diffraction beam of parallel rays passes through a second hologram 122. The hologram 122 functions to transmit, for example, a P-polarized light and diffracts an S-polarized light, so that the P-polarized light transmitted through the hologram 122 passes through a $\frac{1}{4} \lambda$ plate 125 and is then diffracted by a third hologram 123 to be converged upon the optical disk M. The signal beam reflected by the optical disk M passes through the third hologram and comes to the second polarizing hologram 122 through the $\frac{1}{4} \lambda$ plate 125. When the signal beam passes through the $\frac{1}{4} \lambda$ plate 125, the P-polarized beam is converted to the S-polarized beam, so that the S-polarized beam is diffracted by the second hologram 122 toward a fourth hologram 124 which in turn converges the beam upon a photodetector 126.

However, in the optical pickup shown in FIG. 81, when the wavelength of the laser beam changes, aberration and deviation of the focal point take place, as mentioned before.

The optical pickup shown in FIG. 28 is free from these drawbacks.

In FIG. 28, the first and second in-line grating lenses 11 and 12 are located on the optical axis between the semiconductor laser LD and the optical disk M. In the illustrated embodiment, a polarization beam splitter 33 and a $\frac{1}{4} \lambda$ plate 31 are provided between the semiconductor laser LD and the first grating lenses 11 and between the second grating lens 12 and the optical disk M, respectively.

The polarization beam splitter 33, which will be referred to as PBS hereinafter, transmits the P-polarized beam and reflects the S-polarized beam in this embodiment.

The grating lenses 11 and 12 have the spatial frequency distributions as shown in FIG. 2.

The laser beam (spherical wave) issued from the LD is transmitted through the PBS 33 and is incident upon the first grating lens 11. The beam incident upon the first grating lens 11 is diffracted in symmetry with respect to the optical axis and is then converged upon the optical disk M through the $\frac{1}{4}$ plate 31 by the second grating lens 12.

If the wavelength of the laser beam fluctuates (e.g., within ±14 nm with respect to the center wavelength $\lambda_0 = 830$ nm), a stable beam spot having a constant diameter can be focused on a desired point of the disk M, by the grating lens assembly of the present invention.

The signal beam which is designated by dotted lines and which is reflected by the disk M passes along the same optical path as the incident beam in the opposite direction and comes to the PBS 33. It is to be noted here that when the signal beam passes through the $\frac{1}{4} \lambda$ plate, the beam is converted to an S-polarized beam. The S-polarized signal beam is reflected by the PBS 33 and is then converged upon the photodetector 32. Since the signal beam passes through the grating lens assembly of the first and second grating lenses 11 and 12 according to the present invention, a stable beam having a constant small diameter can be focused on the photodetector 32. As is well known, focusing error and tracking error can be detected by inserting a knife edge (not shown) between the PBS 33 and the photodetector 32 and behind the converging point of the signal beam. In this case, the photodetector 32 would be located behind the knife edge.

Figure 29:
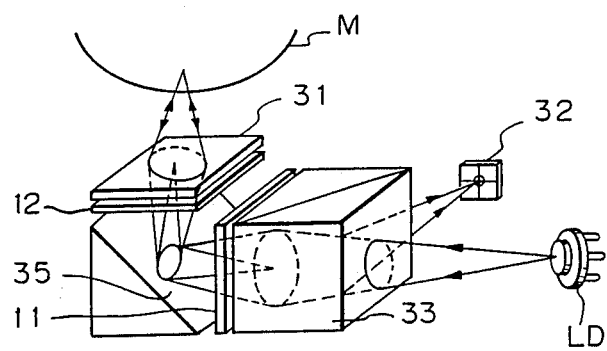
FIG. 29 is a perspective view of an optical pickup according to another embodiment of the present invention.

FIG. 29 shows an example of an actual construction of the optical pickup shown in FIG. 28. In the actual arrangement, it is preferable to provide a mirror 35 between the first and second grating lenses 11 and 12 to bend the optical axis by 90° between the first and second grating lenses 11 and 12, so that a thinner and more compact optical pickup can be realized.

In FIG. 29, the incident laser beam issued from the LD passes through the PBS 33 and is diffracted in symmetry with respect to the optical axis by the first grating lens 11. The optical axis between the first grating lens 11 and the LD is parallel to the plane of the disk M. The diffracted beam by the first grating lens 11 is bent in a direction perpendicular to the optical axis of the first grating lens 11, i.e., perpendicular to the plane of the disk M by the mirror 35. The incident beam reflected and bent by the mirror 35 passes through the second grating lens 12 and the ¼ λ plate 31 and is converged upon the disk M. The signal beam reflected by the disk M goes along the same optical path as that of the incident beam, but in the opposite direction, and is reflected by the PBS 33 to be converged upon the photodetector 32, which is located at a position different from the LD and at the same focal length of the first grating lens as the LD.

It is possible to locate the ¼ λ plate 31 which is located between the disk M and the second grating lens 12 in the embodiments shown in FIGS. 28 and 29, any place between the disk M and the PBS 33.

For instance, the ¼ λ plate 31 can be placed between the first and second grating lenses 11 and 12 or between the PBS 33 and the first grating lens 11.

Figure 30:
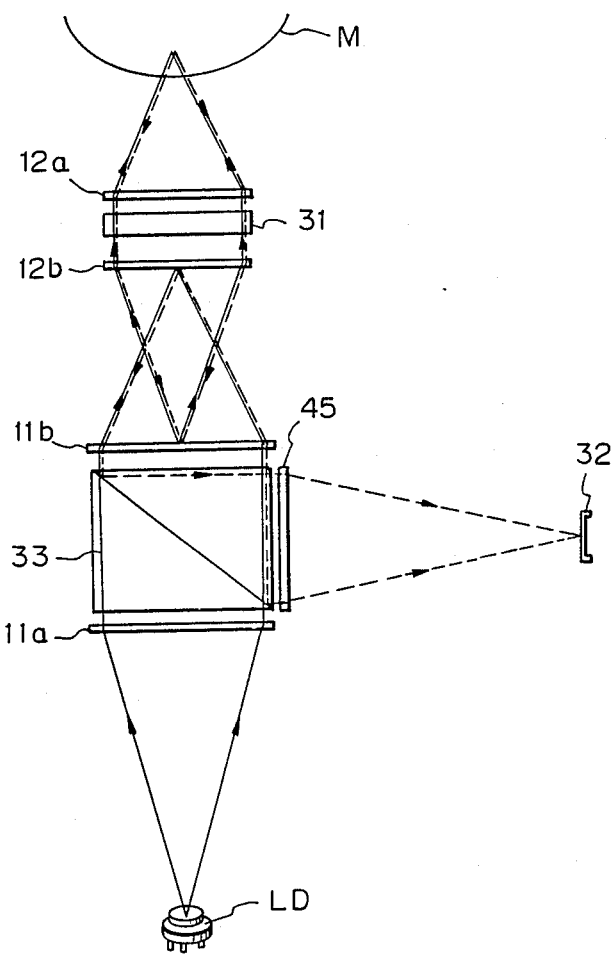
FIG. 30 is a schematic view of an optical pickup according to still another embodiment of the present invention.

FIG. 30 shows a variant of FIG. 28, in which variant the optical grating lens system shown in FIG. 4 is incorporated. Namely, the first grating lens 11 is composed of two in-line grating lenses 11a and 11b and the second grating lens 12 is composed of two in-line grating lenses 12a and 12b, respectively. The PBS 33 is located between the grating lenses 11a and 11b, and the ¼ λ plate 31 is located between the grating lenses 12a and 12b. The optical function of the grating lens assembly having the first grating lens 11 which is divided into two grating lenses 11a and 11b and the second grating lenses 12 which is divided into two grating lenses 12a and 12b is the same as that shown in FIG. 4.

In the embodiment illustrated in FIG. 30, a fifth in-line grating lens 45 is provided between the PBS 33 and the photodetector 32. The fifth grating lens 45 converges the parallel rays of a signal beam which is split by the PBS 33 upon the photodetector 32. The fifth grating lens 45 has a spatial frequency distribution similar to the grating lenses 11a and 12a.

In the embodiment shown in FIG. 30, the incident beam (spherical wave) which is issued from the LD is converted to parallel rays of a beam by the grating lens 11a and is transmitted through the PBS 33 and comes to the -grating lens 11b. The parallel rays of the beam incident upon the grating lens 11b are diffracted to intersect with each other in symmetry with respect to the optical axis and are converted to parallel rays of the beam again by the grating lens 12b. The parallel beam passes through the ¼ λ plate 31 and is converged upon the focal point on the disk M by the grating lens 12a. The beam spot thus obtained is free from aberration and deviation of the focal point even under the fluctuation of the wavelength, as mentioned above.

The signal beam which is reflected by the disk M is returned to the PBS 33 in the direction opposite to the direction of the incident beam. Since the signal beam is converted to an S-polarized beam when it passes through the ¼ λ plate 31, the signal beam is reflected by the PBS 33 to be converged upon the photodetector 32 through the fifth grating lens 45. Since the signal beam passes through the grating lens assembly having the grating lenses 12a, 12b and 11b, 45, the fluctuation of the wavelength can be compensated for. It will be understood that for the signal beam reflected by the disk M, the fifth grating lens 45 corresponds to the grating lens 11a.

Namely, the first grating lens is formed by the grating lens 11a and 11b, for the incident beam issued from the LD and by the grating lens 11b and the fifth grating lens 45, for the signal beam to be converged upon the disk M.

Since the PBS 33 is placed between the grating lenses 11a and 11b, the polarization splitting layer of the PBS 33 receives the parallel beam, so that the condition of the incident angle is identical anywhere in the polarization splitting layer, resulting in an increased polarization splitting efficiency. This results in an increased efficiency of the detection of the photodetector 32. The same is true in the ¼ λ plate 31.

Figure 31:
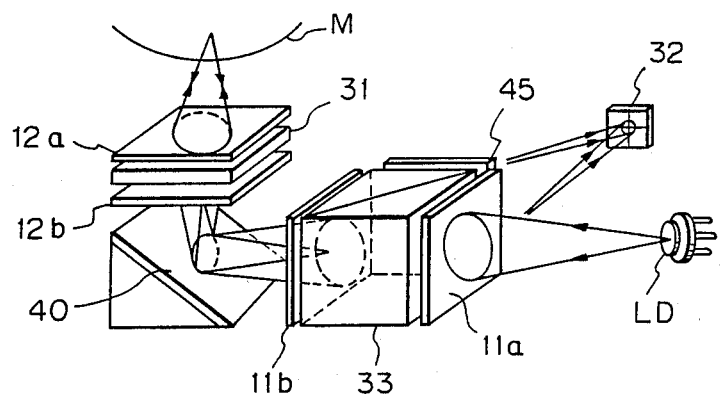
FIG. 31 is a perspective view of an optical pickup according to another embodiment of the present invention.
Figure 32:
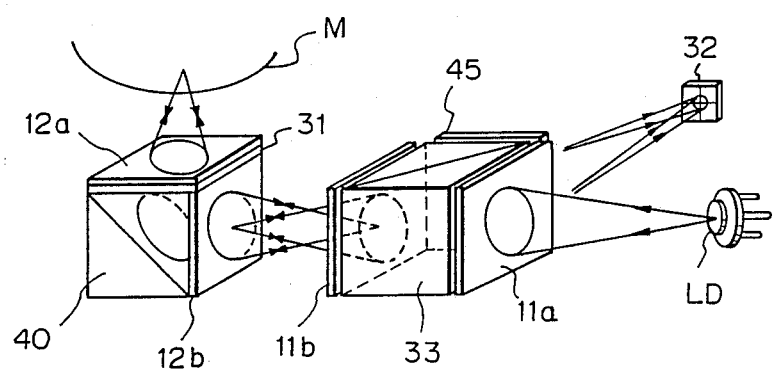
FIG. 32 is a perspective view of an optical pickup according to a different embodiment of the present invention.

FIGS. 31 and 32 show two examples of actual constructions of the pickup shown in FIG. 30.

In FIG. 31, a mirror 40 is provided between the grating lens 11b. and the grating lens 12b, so that the optical axis of the first grating lens 11 is perpendicular to the optical axis of the second grating lens 12, resulting in a thinner and more compact pickup, similar to the embodiment shown in FIG. 29.

In FIG. 32, the mirror 40 is located between the grating lens 12b and the ¼ λ plate 31. In this embodiment illustrated in FIG. 32, the thickness of the pickup when viewed in the direction perpendicular to the plane of the disk M, i.e., in the direction of the optical axis of the second grating lens 12, can be further reduced in comparison with the embodiment illustrated in FIG. 31, since grating lens 12b is located on the optical axis of the first grating lens 11 in FIG. 32.

If reduction of the thickness of the pickup is not desired, the ¼ λ plate 31 can be placed anywhere between the disk M and the PBS 33, and the PBS can be located between the LD and the grating lens 11a instead of between the grating lenses 11a and 11b. In the alternative in which the PBS 33 is arranged between the LD and the grating lens 11a, the fifth grating lens 45 can be dispersed with.

Figure 33:
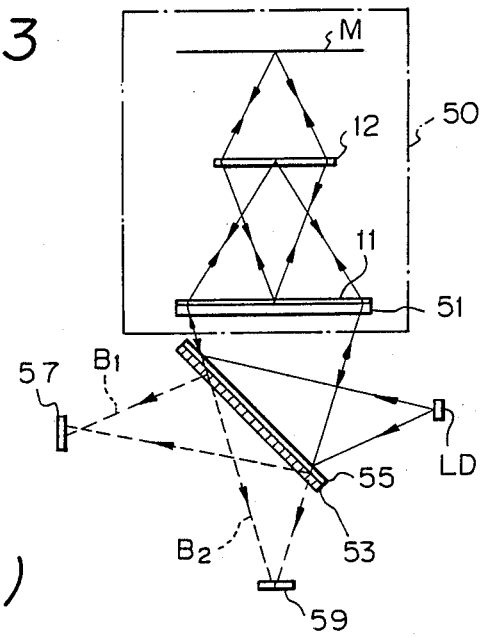
FIG. 33 is a schematic view of an optical pickup according to a different embodiment of the present invention.

FIG. 33 shows an optical pickup according to another aspect of the present invention, in which the grating lens assembly having the first and the second grating lenses 11 and 12, as shown in FIG. 3 is generally designated by 50.

In FIG. 33, a plate-like PBS 55 which has thereon a third grating lens 53 integral therewith is located between the LD and the grating lens assembly 50. The PBS 55 transmits only a linearly polarized light of a specific direction, for example, only an P-polarized light, (or S-polarized light) and reflects the S-polarized light (or P-polarized light).

In the arrangement illustrated in FIG. 33, the first grating lens 11 has a ¼ λ plate 51 thereon. It is not always necessary to physically apply the ¼ λ plate 51 to the first grating lens 11. The laser beam issued from the LD is reflected by the PBS 55 which is inclined with respect to the optical axis of the grating lens assembly 50 and is incident upon the first grating lens 11 of the grating lens assembly 50. In the illustrated embodiment, the LD emits the P-polarized light in the direction perpendicular to the optical axis of the grating lens assembly 50 and the PBS 55 is inclined, for example, at 45° with respect to the optical axis of the grating lens assembly 50.

When the beam reflected by the PBS 55 passes through the ¼ λ plate 51, the incident beam (e.g., P-polarized light) is converted to a circularly polarized light, so that the circularly polarized light is incident upon the first grating lens 11 of the grating lens assembly 50. The beam incident upon the grating lens assembly 50 is converged upon a predetermined point on the disk M without aberration even under the fluctuation of the wavelength and without deviation of the focal point, as mentioned before.

The signal beam reflected by the disk M is returned to the PBS 55, as mentioned before. When the signal beam passes through the ¼ λ plate 51, the signal beam is converted to a linearly polarized light. Namely the polarizing angle is changed by 90°. That is, the polarizing angle of the incident light upon the ¼ λ plate 51 is different by 90° from that of the signal beam transmitted through the ¼ λ plate 51. Therefore, the signal beam past the ¼ λ plate 51 is transmitted through the PBS 55.

According to the embodiment illustrated in FIG. 33, since the plate-like PBS 55 is provided with the third grating lens 53 integral therewith, which serves as a half mirror, the signal beam is partly diffracted by the third grating lens 53 and is partly transmitted therethrough. One of the diffraction beam and the transmission beam, for example, the diffraction beam B1, is converged upon a focusing photodetector 57, and the other beam, i.e., the transmission beam B2, is converged upon a tracking photodetector 59.

The grating lens 53 can be easily given such a property of a half mirror by properly designing its grating (interference fringes).

The focusing photodetector 57 and the tracking photodetector 59 are, for example, well known two-divided photodetectors, each having PIN photodiodes. Pits on the optical disk M, namely, the signals of channel-bits, can be detected by the photodetectors 57 and 59, outputs of which vary in accordance with the channel-bits.

Figure 34A:
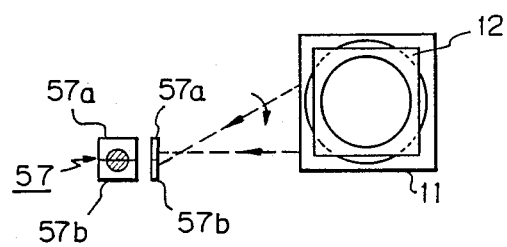
FIG. 34 is a schematic view showing how to detect focusing beams in a pickup shown in FIG. 33.
Figure 34B:
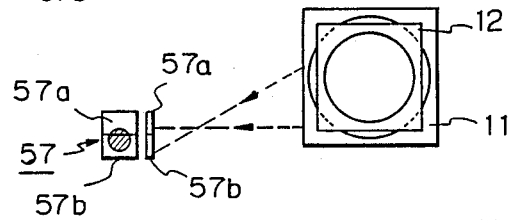
Figure 34C:
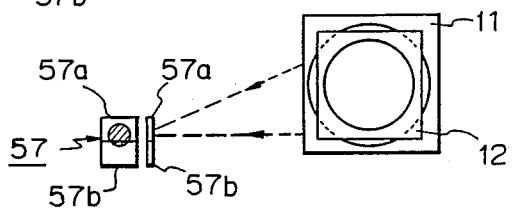

In the illustrated embodiment, as can be seen from FIG. 34, the focusing photodetector 57 is located slightly behind the focal point at which the signal beam is converged by the grating lens 53, so that two photodiodes 57a and 57b of the focusing photodetector 57 receive the identical amount of light when the optical disk M is exactly located at the distance of the focal length from the second grating lens 12. This exact focusing position is shown in FIG. 34(a). If the disk M is located far from the exact focal position shown in FIG. 34(a), the lower photodiode 57b receives a larger amount of light than that of the upper photodiode 57a, as can be seen from FIG. 34(b). Namely, the output of the lower photodiode 57b is larger than that of the upper diode 57a. On the contrary, if the optical disk M is located closer to the second grating lens 12 from the correct focal point, the amount of light which the upper photodiode 57a receives is larger than the amount of light which the lower photodiode 57b receives, as can be seen from FIG. 34(c).

The focusing error detection method shown in FIG. 34 can be considered one kind of "knife edge method".

Preferably, the separation line which divides the two photodiodes 57a and 57b extends in a direction perpendicular to the interference fringes 53a of the third grating lens 53. Namely, when the wavelength of the laser beam fluctuates, the fluctuation can be effectively absorbed in the grating lens assembly 50 of the present invention as mentioned before, the diffraction direction of the beam by the third grating lens 53 changes in accordance with the fluctuation of the wavelength. Accordingly, when the separation line of the photodiodes 57a and 57b extends in a direction the same as the direction of change of the diffraction direction of the beam by the third grating lens 53, that is, the direction perpendicular to the interference fringes 53a (FIG. 35), the beam spot converged on the photodetector 57 moves only on the separation line and accordingly always comes onto the center line, i.e., the separation line, depending on the change of the diffraction angle (direction) due to the fluctuation of the wavelength.

Figure 36A:
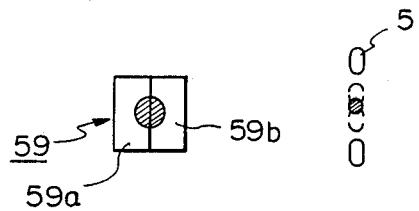
FIG. 36 is a schematic view showing the detection of a tracking beam in a pickup shown in FIG. 33.

FIG. 36 shows the tracking photodetector 59. In an optical pickup, the tracking is effected by detecting the pits 5 of the disk M. The separation line of the two photodiodes 59a and 59b extends parallel to the tracks of the pits 5 of the disk M. When the beam spot is located on the center of the associated pit 5, the signal beam is converged upon the center of the separation line of the two photodiodes 59a and 59b, as shown in FIG. 36(a).

Figure 36B:
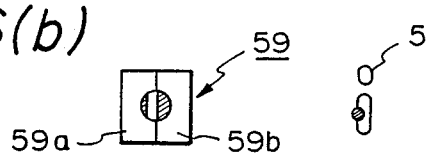
Figure 36C:
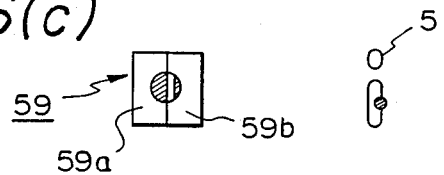

When the beam-spot on the associated pit 5 deviates in the left direction, the amount of light which the left photodiode 59a receives decreases, as shown in FIG. 36(b). On the contrary, when the beam spot on the pit 5 deviates in the right direction, the amount of light which the right photodiode 59b receives decreases, as shown in FIG. 36(c).

Figure 37:
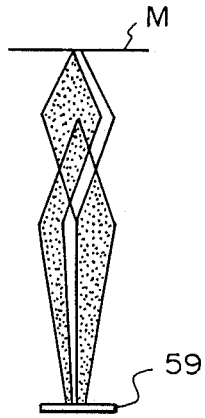
FIG. 37 is an explanatory view showing the "inversion" of a dark portion of the light.

In FIG. 36, the white portion of the beam spot on the photodiodes 59a and 59b actually appears as a dark portion. In the present invention, since the rays of the beam are diffracted to intersect in symmetry of revolution with respect to the optical axis, as mentioned before, the dark portion of the beam spot on the photodetector 59 due to the deviation of the beam spot on the disk M appears on the photodiode that is located in the opposite side to the deviation of the beam spot on the disk M, as can be seen from FIG. 37.

The tracking error detecting method utilizes a so-called "push-pull method" in which the difference in the amount of light between the two photodiodes is detected.

Figure 38:
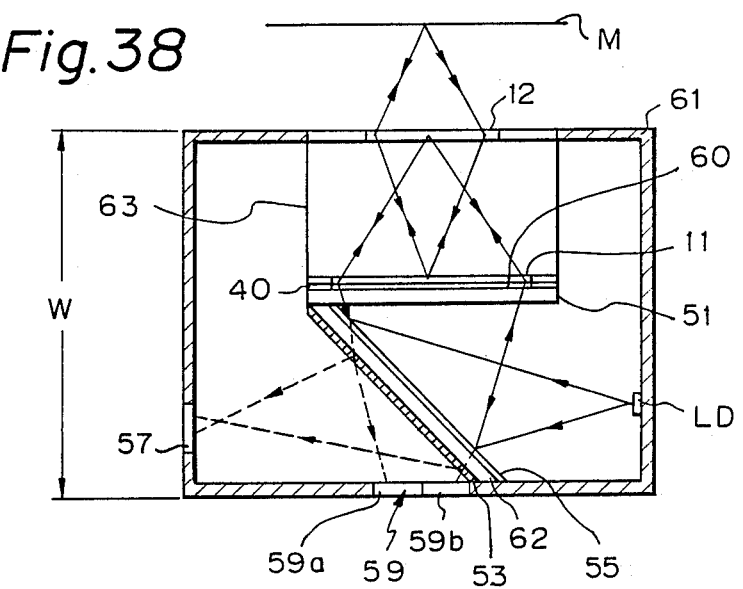
FIG. 38 is a partially sectioned view of an actual construction of an optical pickup shown in FIG. 33.

FIG. 38 shows an example of an actual construction of a pickup for an optical disk M according to the principle shown in FIG. 33. In FIG. 38, the first grating lens 11, the second grating lens 12, and the ¼ λ plate 51 are formed together in advance by a frame 63 and the secured to a housing 61. Numeral 40 designates a spacer which is located between the first grating lens 11 and the ¼ λ plate 51. This is negligible from an optical viewpoint.

The PBS 55 and the third grating lens 53 are integrally formed on the opposite sides of the glass plate 62, which is secured in place to the housing 61. The focusing photodetector 57 and the tracking photodetector 59 are directly housed in the wall of the housing 61. The semiconductor laser LD is also secured to the housing 61.

It is also possible to provide a transparent body, such as a glass plate, between the first and second grating lenses 11 and 12, as shown in FIG. 16.

The adjustment of the convergence of the incident beam upon the disk M can be easily effected by the positional adjustment of the LD. The adjustment of the convergence of the signal beam upon the photodetectors can be easily effected by the positional adjustment of the photodetectors 57 and 59.

According to the arrangement shown in FIG. 38, the tracking photodetector 59, which has two photodiodes 59a and 59b, is located close to the third grating lens 53, since the tracking photodetector 59 can detect the signal beam merely by detecting the difference in the amount of light between the two photodiodes 59a and 59b. This close arrangement of the tracking photodetector 59 contributes to a reduction of the thickness (width) W of the housing 61, resulting in a small pickup.

Note that when a tracking error or focusing error is detected by the tracking photodetector 59 or the focusing photodetector 57, the correction (adjustment) of the optical system in the pickup can be effected, for example, by moving the entirety of the pickup, i.e., the housing 61, by a proper actuator, as shown in FIG. 15 or 21, with respect to the optical disk M.

Figure 39:
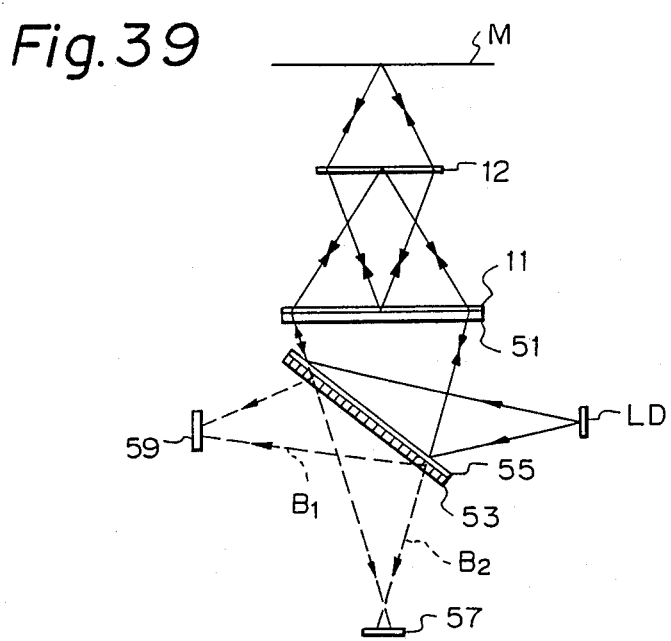
FIG. 39 is a schematic view of another optical pickup of the present invention.

FIG. 39 shows a variant of FIG. 33. In FIG. 39, the positional relationship of the photodetectors 57 and 59 is opposite to that of the photodetectors in FIG. 33. Namely, in FIG. 39, the transmission beam B2 of the third grating lens 53 is introduced to the focusing photodetector 57 and the diffraction beam B1 of the third grating lens 53 is introduced to the tracking photodetector 59.

Other aspects of the arrangement shown in FIG. 39 are the same as in the embodiment shown in FIG. 33.

The tracking photodetector 59 has two photodiodes 59a and 59b, similar to FIG. 36. The tracking error can be detected by detecting a difference in the amount of light between the two photodiodes 59a and 59b in the push-pull method.

Figure 40A:
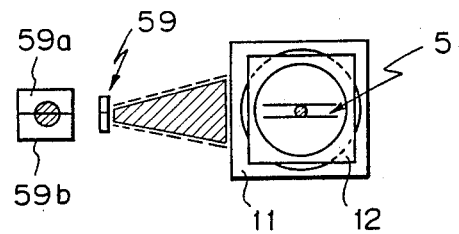
FIG. 40 is a view showing the detection of a tracking beam, in a pickup shown in FIG. 39.
Figure 40B:
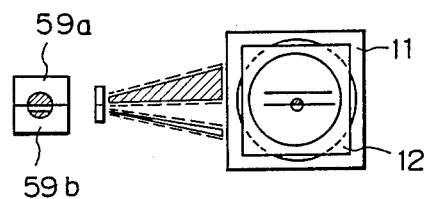
Figure 40C:
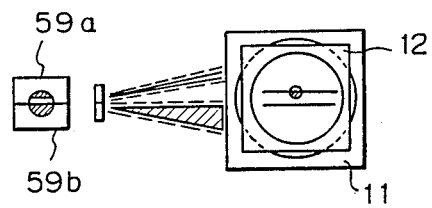

The separation line of the two photodiodes 59a and 59b extends parallel to the track of the optical disk M, so that when the beam spot converged upon the track of the disk M deviates upward and downward, as shown in FIG. 40, there is a difference in the amount of light between the photodiodes 59a and 59b, so that the tracking error can be detected.

FIGS. 40(a), (b), and (c) show three positions in which the beam is correctly focused on the track (pit) of the disk M, the beam deviates downward, and the beam deviates upward, respectively.

Figure 35A:
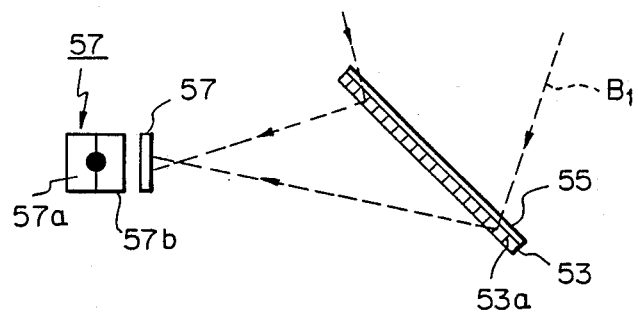
FIG. 35 is a schematic view showing that a change of wavelength of incident light does not have any adverse influence on a focusing detector in a pickup shown in FIG. 33.
Figure 35B:
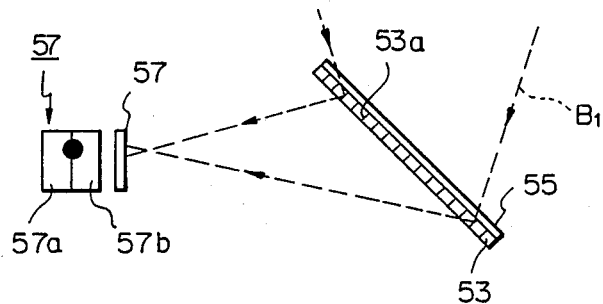
Figure 35C:
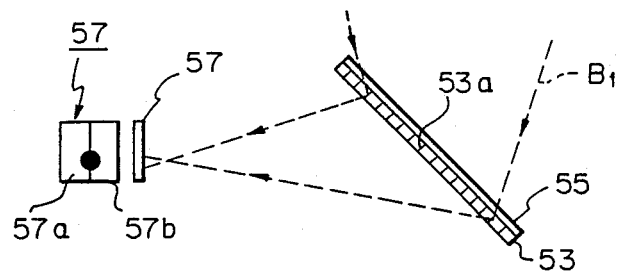

The separation line of the photodiodes 59a and 59b preferably extends in a direction perpendicular to the interference fringes 53a of the third grating lens 53 for the same purpose as that of FIG. 35. In FIG. 41(a), (b), and (c) correspond to the positions shown in FIG. 40(a), (b), and (c), respectively.

Figure 42A:
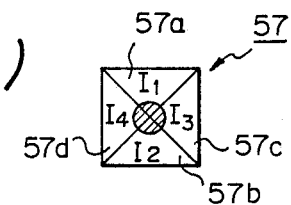
FIG. 42 is a view showing the detection of a focusing beam in a pickup shown in FIG. 39.

In the embodiment shown in FIG. 39, the focusing photodetector 57 is a well known four-divided photodetector having four PIN photodiodes 57a, 57b, 57c, and 57d. The associated pits of the disk M (signal beam) can be detected by the sum $(I_1+I_2+I_3+I_4)$ of outputs of the photodiodes, as is well known. The four photodiodes 57a, 57b, 57c, and 57d are geometrically arranged so that the focused beam spot can be located on the center of the four photodiodes, as shown in FIG. 42(a).

Figure 42B:
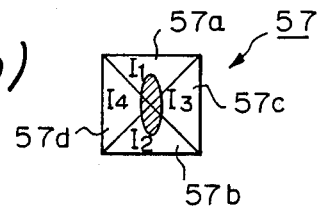
Figure 42C:
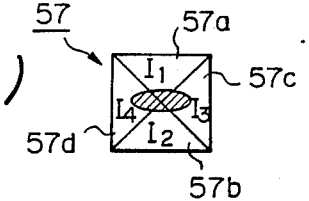

If the optical disk M comes closer to the second grating lens 12 from the focal point, the beam spot on the photodetector 57 deforms to an elliptical shape as shown in FIG. 42(b). On the contrary, if the disk M comes far from the second grating lens 12 with respect to the focal point, the beam spot on the photodetector 57 deforms to an elliptical shape with a major axis extending perpendicular to the major axis or the ellipse shown in FIG. 42(b), as shown in FIG. 42(c).

Accordingly, by detecting the error signal represented by a difference value $\{(I_1+I_2)-(I_3+I_4)\}$, the focusing error can be detected. Namely, when the difference value is zero, the disk M is correctly located at the focal point of the grating lens assembly.

When the difference value is positive ($>0$), the disk M comes closer to the second grating lens. When the difference value is negative ($<0$), the disk M comes farther from the second grating lens. The focusing can be performed by moving the housing 61 in a predetermined direction in accordance with the difference value by an actuator (not shown) so as to make the difference value equal to zero. This is called the astigmatism method. The glass plate 62 which is provided on its opposite sides with the third grating lens 53 and the PBS 55 is an astigmatism element.

Figure 43:
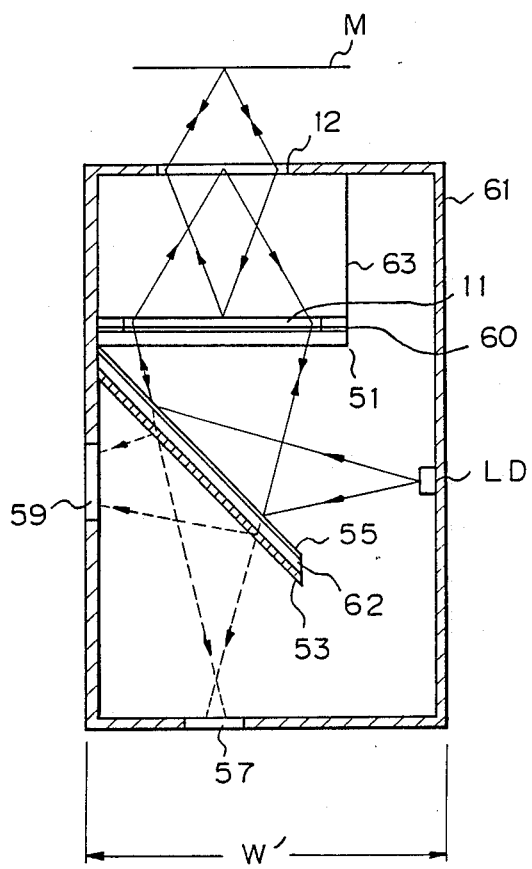
FIG. 43 is a partial sectional view of an actual construction of an optical pickup shown in FIG. 39.

FIG. 43 shows an example of an actual construction of an optical pickup corresponding to FIG. 39.

The arrangement shown in FIG. 43 is the same as that of FIG. 38, except for the location of the focusing and tracking photodetectors 57 and 59. Namely, in FIG. 43, the tracking photodetector 59 and the focusing photodetector 57 are located at the positions of the focusing and tracking photodetectors 57 and 59 in FIG. 38, respectively. According to the embodiment illustrated in FIG. 43, the lateral width W' of the housing 61 can be decreased for the same reason as explained with respect to the width W in FIG. 38.

The tracking and focusing photodetectors 59 and 57 are not limited to the two-divided or four-divided detectors.

It should be appreciated that although the PBS 55 reflects the incident beam from the LD and transmits the signal beam in return from the disk in the aforementioned embodiment, it is possible to use a PBS which transmits the incident beam from the LD and reflects the signal beam in return.

FIGS. 44 to 55 show different embodiments which realize a two-beam type of optical pickup.

In an optical pickup in which information can be written by a user, it is necessary to read out the information to check whether or not the information is written on an optical disk after the information is written in the form of pits. To decrease the checking time, two beams are usually used, one of which is a reading beam and the other is a writing beam which is located in the vicinity of the reading beam.

Figure 82:
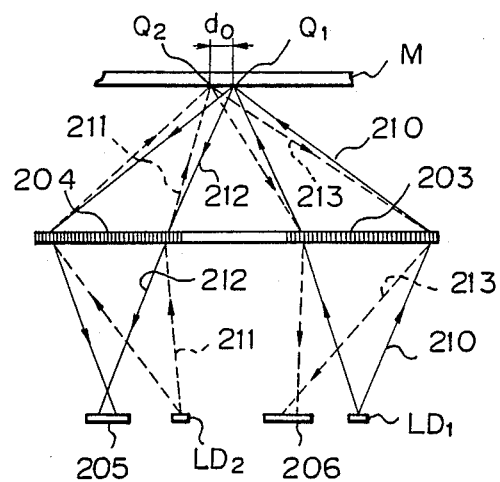
FIG. 82 is a view of a known two-beam type of optical hologram pickup.

FIG. 82 shows a two-beam type of optical pickup disclosed in Japanese Patent Application No. 61-43702, which was filed in the name of an assignee of the present application. In FIG. 82, hologram lenses (grating lens) are used to realize a compact and small pickup. Looking at FIG. 82, laser beams 210 and 211, issued from two semiconductor lasers LD1 and LD2 are converged upon respective focal points Q1 and Q2 of the optical disk M by two hologram lenses 203 and 204 without aberration. The two points Q1 and Q2 are spaced at a predetermined distance $d_0$ in the direction of track grooves of the disk M.

The signal beams 212 and 213 reflected at the points Q1 and Q2 are converged upon respective photodetectors 205 and 206 by the opposite hologram lenses 204 and 203, respectively. Namely, the beam 210 from the LD1 is converged upon the point Q1 by the hologram lens 203. The signal beam 212 reflected at the point Q1 is converged by the other hologram lens 204 upon the photodetector 205. On the other hand, the beam 211 from the LD2 is converged upon the point Q2 by the second hologram 204 and the signal beam from the point Q2 is converged upon the second photodetector 206 by the first hologram lens 203. Since the wavelengths of the beams 210 and 211 are different from each other, the signal beams (reflected beams) 212 and 213 are not returned to the LD1 and LD2, and come to the photodetectors 205 and 206 which are located adjacent to the respective LD2 and LD1. Thus the optical paths of the two beams are spatially separated and accordingly neither a polarizing beam splitter nor $\frac{1}{4} \lambda$ plate are necessary.

However, in the optical pickup shown in FIG. 82, aberration and/or deviation of the focal point of the hologram lens system occurs when the wavelengths of the laser beams 210 and 211 change, as mentioned before.

The present invention is also applicable to this kind of two-beam optical pickup to eliminate the problems of the occurrence of aberration and deviation of the focal point depending on the fluctuation of the wavelengths of the used laser beams.

In an embodiment shown in FIGS. 44 and 45, the first grating lens 11 is divided into two sections with respect to a plane including the optical axis, for each of the beams 210 and 211. This will be explained below in more detail with reference to FIGS. 46 and 47.

Figure 46:
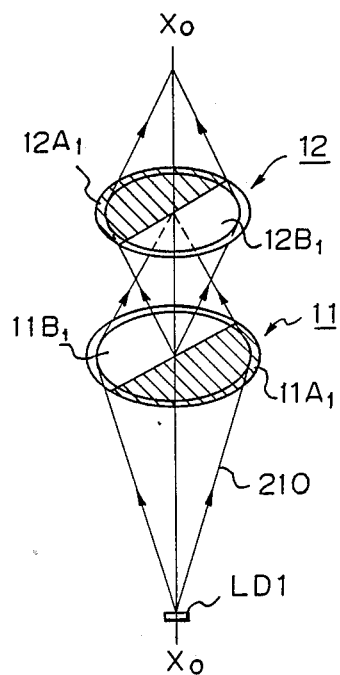
FIG. 46 is a schematic view showing a principle of a two-beam type of optical pickup shown in FIGS. 44 and 45.

In FIG. 46, the first and second grating lenses 11 and 12 are divided into two first and second sections 11A1, 11B1; 12A1, 12B1, having different diffraction angles, i.e., different spatial frequency distributions, respectively.

Note that the first and second sections 12A1 and 12B1 of the second grating lens 12 are provided only for clarification and easy correspondence to the two sections 11A1 and 11B1 of the first grating lens 11. Accordingly, they may have the same diffraction angle, i.e., the same spatial frequency distribution. In other words, it is not always necessary to divide the second grating lens 12 into two sections, as will be clarified hereinafter.

Figure 47:
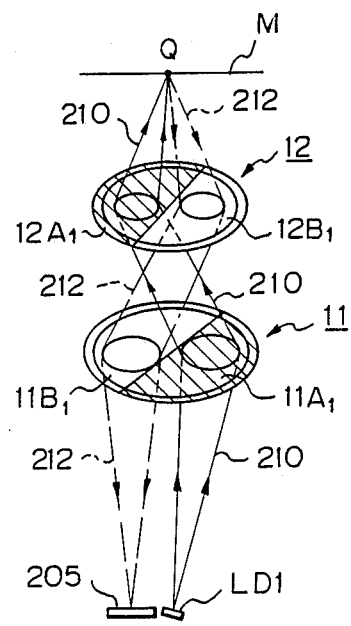
FIG. 47 is a schematic view showing a principal arrangement of a first beam in a two-beam type of optical pickup shown in FIGS. 44 and 45.

With the arrangement shown in FIGS. 46 and 47, when the first beam 210 (spherical wave having the wavelength $\lambda_1$) issued from the first semiconductor laser LD1 is incident upon the first section 11A1 of the first grating lens 11 at a predetermined inclination angle with respect to the optical axis $X_0$-$X_0$, the beam is diffracted in symmetry of revolution with respect to the optical axis by the first section 11A1. Thus the diffraction beam comes to the first section 12A1 of the second grating lens 12. The first and second sections 11A1 and 11B1 of the first grating lens 11 are in symmetrical arrangement with the second and first sections 12B1 and 12A1 of the second grating lens 12 when viewed in a plane perpendicular to the optical axis $X_0$-$X_0$. The beam incident upon the first section 12A1 of the second grating lens 12 is diffracted to be converged upon the point Q of the optical disk M by the first section 12A1 of the second grating lens 12. The spatial frequencies of the first and second grating lenses 11 and 12 are determined, so that the beam of the first LD1 follows the path mentioned above.

The beam converged upon the point Q at a predetermined inclination angle with respect to the plane of the disk M is reflected at the point Q in the symmetrical direction with respect to the optical axis and comes to the second section 12B1 of the second grating lens 12. The signal beam from the point Q is then diffracted by the second section 11B1 in a symmetrical direction with respect to the diffraction direction of the incident beam from the first LD1 mentioned above by the first section 11B1 of the second grating lens 12 and comes to the second section 11B1 of the first grating lens 11.

If the first section 11A1 and the second section 11B1 of the first grating lens 11 were given the same spatial frequency, the signal beam 212 incident upon the second section 11B1 of the first grating lens 11 would be returned to the LD1, resulting in nondetection of the signal beam. This is the reason why the first section 11A1 and the second section 11B1 of the first grating lens 11 have different spatial frequency distributions. Because of the difference in spatial frequency between the first and second sections of the first grating lens, the signal beam 212 incident upon the second section 11B1 of the first grating lens 11 can be converged upon a photodetector 205 located at a position different from LD1. The spatial frequency of the second section 11B1 of the first grating lens 11 can be determined in accordance with the photodetector 205.

As can be understood from the foregoing, the incident beam 210 and the signal beam 212 can be completely symmetrical with respect to the optical axis $X_0$-$X_0$ in the second grating lens 12. Accordingly, it is unnecessary to divide the second grating lens 12 into the two sections 12A1 and 12B1, as mentioned before.

The first section 12A1 through which the inward beam from the LD and to the point Q passes and the second section through which the outward beam (signal beam) from the point Q passes are named only for correspondence to the first and second sections of the first grating lens 11.

Figure 48:
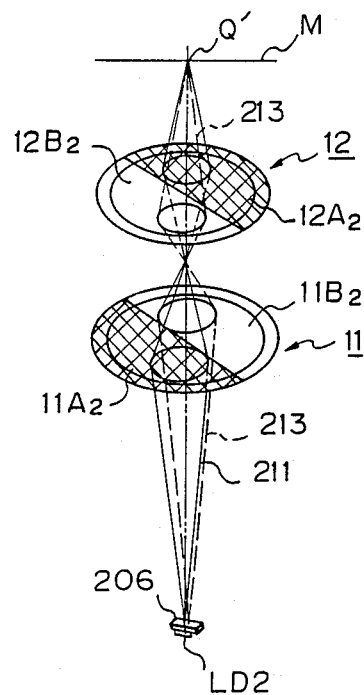
FIG. 48 is a view similar to FIG. 47 for a second beam in a two-beam type of optical pickup.

The above discussion is also applicable to the second beam 211 which is issued from the second semiconductor laser LD2, as can be seen from FIG. 48. In FIG. 48, the first grating lens 11 is divided into two sections 11A2 and 11B2, which have different spatial frequencies, with respect to a plane including the optical axis. The second grating lens 12 is also nominally divided into two sections 12A2 and 12B2. The signal beam 213 reflected at the point Q' of the disk M is diffracted by (the second section 12B2 of) the second grating lens 12 and is then diffracted by the second section 11B2 of the first grating lens 11 to be converged upon a second photodetector 206 which is located at a position different from the LD2.

As can be seen from the foregoing, the essential feature of the two-beam type optical pickup according to the present invention is to provide separate paths for the inward and outward beams.

The suffixes A and B correspond to the inward beam and the outward beam (signal beam), respectively. The suffixes 1 and 2 correspond to the first grating lens 11 and the second grating lens 12. Accordingly, for instance, 11A designates the first section through which the inward beam 211 passes.

FIGS. 44 and 45 show a basic construction of the two-beam optical pickup according to the present invention, of which FIG. 44 corresponds to the first inward beams 210 and 211 issued from LD1 and LD2 and FIG. 45 corresponds to the outward beams (signal beams) 212 and 213 reflected from the points Q and Q' on the disk M.

Generally speaking, in a two-beam pickup, the first beam having the wavelength $\lambda_1$ is used to write and erase the information in the recording disk M and the second beam having the wavelength $\lambda_2$ is used to read (reproduce) the information to check whether or not the information is correctly written. The second beam is spaced behind at a predetermined slight distance $d_0$ from the first beam in the direction of the tracks of the disk M. Either beam can be used for reading the information.

In FIG. 44, supposing that the track direction is represented by the direction Z, the second converging point Q' of the second beam 211 is spaced from the first converging point Q of the first beam 210 at a distance $d_0$, which is usually 10 to 20 $\mu$m.

Figure 49:
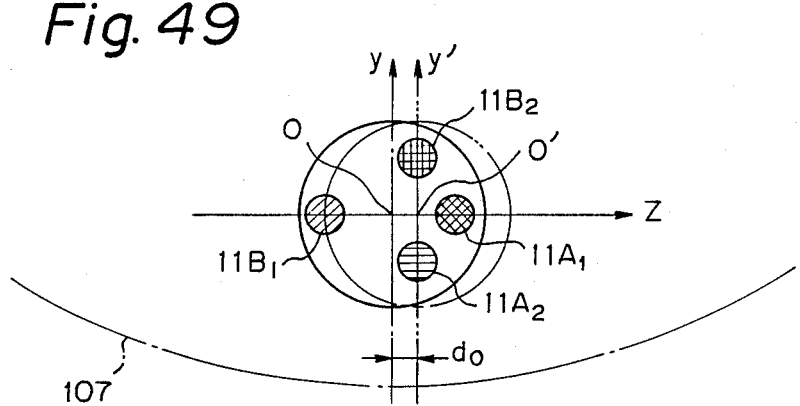
FIG. 49 is a plan view showing a geometrical arrangement of two divisional areas in a two-beam type of optical pickup.

The center 0 (FIG. 49) of the separation line passing through the optical axis $X_0$-$X_0$ between the first and second sections 11A1 and 11B1, for the first inward beam 210 ($\lambda_1$) is spaced at the distance $d_0$ in the direction Z, from the center 0' of the separation line passing through the optical axis $X_0'$-$X_0'$ between the first and second sections of the first grating lens 11, for the second inward beam 211 ($\lambda_2$). This relation in a plan view is shown in FIG. 49. Note that although the first and second sections 11A2 and 11B2 of the first grating lens 11 for the second inward beam 211 are located in an arrangement perpendicular to the arrangement of the first and second section 11A1 and 11B1 of the first grating lens 11 for the first inward beam 210, such a perpendicular arrangement is not always necessary. The necessary condition is only the distance $d_0$ between the points O and O' in the direction Z.

The deviation of the arrangement represented by $d_0$ in the direction Z between the first beam and the second beam is also given for the second grating lens 12.

In actual manufacture of the two-beam optical pickup, a proper mask or the like can be used to make the first grating lens (second grating lens), in which the four sections 11A1, 11B1, 11A2, and 11B2 are formed with the arrangement shown in FIG. 49 on a substrate of the first grating lens (second grating lens). Alternatively, it is also possible to locate four grating lenses corresponding to the four sections 11A1, 11B1, 12A1, and 12B1 in the arrangement shown in FIG. 49. The same is true in the second grating lens 12. The spatial frequencies of the first sections 11A1 and 12A1 and the spatial frequencies of the second sections 11B1 and 12B1 are such that the center wavelength thereof is, for example, 830 nm, and the spatial frequencies of the first sections 11A2 and 12A2 and the spatial frequencies of the second sections 11B2 and 12B2 are such that the center wavelength thereof is, for example, 780 nm.

If the wavelengths of the first beam and the second beam are identical to each other, the spatial frequency of the first section 11A1 for the first beam 210 may be identical to the spatial frequency of the second section 11A2 for the second beam 211, and the spatial frequency of the second section 11B1 for the first beam 210 may be identical to the spatial frequency of the second section 11B2 for the second beam 211.

In FIG. 44, the first incident beam 210 ($\lambda_1$) issued from the first LD is incident upon the first section 11A1 of the first grating lens 11 at a predetermined incident angle and diffracted thereby in symmetry with respect to the optical axis in accordance with the spatial frequency of the first section 11A1 toward the first section 12A1 of the second grating lens 12. The beam 210 is then diffracted by the first section 12A1 of the second grating lens 12 in accordance with the spatial frequency thereof to be converged upon the first focal point Q on the disk M. Similarly, the second incident beam 211 ($\lambda_2$) is converged upon the second focal point Q' on the disk M through the first section 11A2 of the first grating lens 11 and the first section 12A2 of the second grating lens 12.

In FIG. 45, the first beam 210 which is converged upon the point Q at a predetermined inclination angle is reflected at the point Q to be the first signal beam 212. The first signal beam 212 follows a different path symmetrically opposed to the path of the inward beam 210 with respect to the optical axis and comes to the second section 12B1 of the second grating lens 12. The signal beam 212 is diffracted by the second section 12B1 in accordance with the spatial frequency thereof to come to the second section 11B1 of the first grating lens 11 and is then diffracted by the latter to be converged upon the first photodetector 205. Similarly, the second incident beam 211 ($\lambda_2$) from the second LD2 is reflected at the second focal point Q' on the disk M and the reflected beam (second signal beam) 213 is diffracted by the second section 12B2 of the second grating lens 12 and through the second section 11B2 of the first grating lens 11 and is finally converged upon the second photodetector 206.

Figure 50:
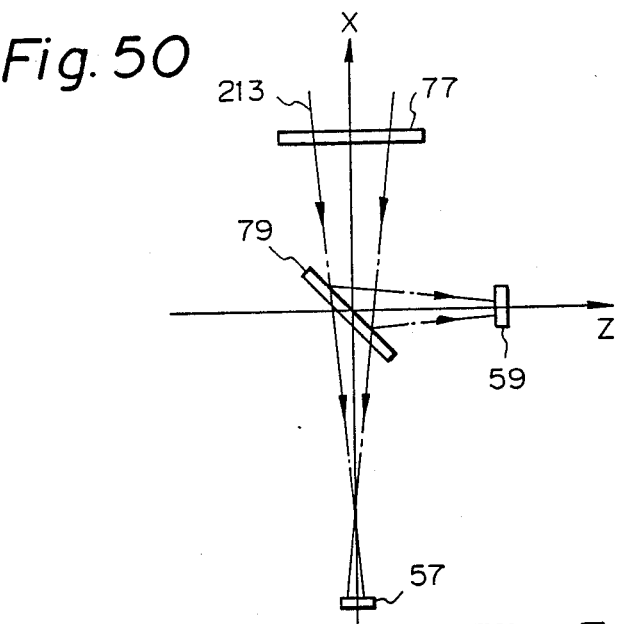
FIG. 50 is a view showing how to detect a signal beam when information is read out.

FIG. 50 shows a signal beam detection method of the second beam 213 of the LD2 (reproduction of information). In FIG. 50, the photodetector consists of a focusing photodetector 57 and a tracking photodetector 59. The photodetectors 57 and 59 can be composed of PIN photodiodes as shown in FIGS. 34, 36, and 42, as previously mentioned before. In FIG. 50, the second signal beam 213 is split by a polarizing beam splitter (PBS) 77, which can be made of a hologram. The PBS hologram 77 can be located, for example, behind the second section 11B2 of the first grating lens 11 when viewed in the direction of travel of the second signal beam. The PBS hologram 77 restricts the amount of the transmission beam therethrough depending on the diffraction angle. Namely, the PBS hologram 77 makes signals represented by the amount of light. The transmission beam of the PBS hologram 77 is divided into two beams by a half mirror 79. One of the divided signal beams is converged upon the focusing photodetector 57 and the other is converged upon the tracking photodetector 59.

Figure 41:
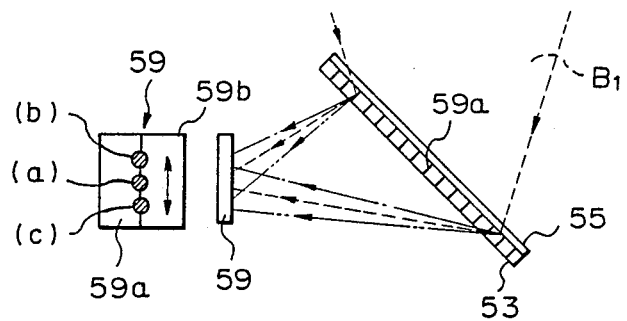
FIG. 41 is an explanatory view showing that a change in the wavelength does not have any adverse influence on the tracking detector.
Figures 51A, 51B:
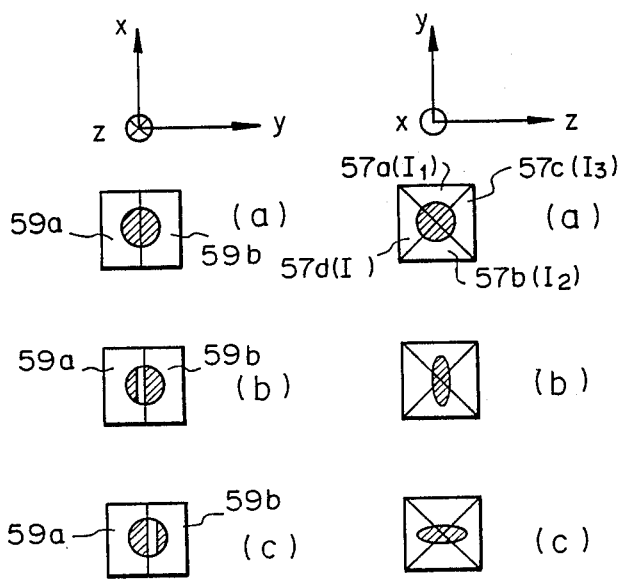
FIG. 51A is a view showing a tracking method in a two-beam type of optical pickup.
FIG. 51B is a view showing a focusing method in a two-beam type of optical pickup.

The tracking error detecting method shown in FIG. 51A and the focusing error detecting method shown in FIG. 51B are similar to those shown in FIGS. 36 and 41, respectively.

FIG. 52 shows a different method of detection of the second signal beam (reproduction of information), in which the reflected beam of the half mirror 79 is used as a focusing error detecting beam and the transmission beam of the half mirror 79 is used as a tracking error detecting beam. This is unlike the arrangement shown in FIG. 50, in which the reflection beam of the half mirror is introduced to the tracking photodetector 59 and the transmission beam of the half mirror 79 is introduced to the focusing photodetector 57, respectively.

In the arrangement shown in FIG. 52, which is a variant of FIG. 50, the tracking error can be detected by a push-pull method as shown in FIG. 53A, similarly to FIG. 51A. The tracking photodetector 59 can be made of two-divided photodiodes as mentioned above.

On the other hand, the focusing can be effected, for example, by a knife edge method in which a knife edge 56 is used (FIG. 52), as shown in FIG. 53B. The knife edge method per se is well known. FIG. 53B shows light distribution by the knife edge method, in which (a) shows an on-focus state 11 during which the disk M is exactly located at the focal point of the second grating lens 12, (b) shows that the disk M comes closer to the second grating lens 12, and (c) shows that the disk M goes farther from the second grating lens 12 respectively. The knife edge 56 is located on the Z axis. In this case, as with the focusing photodetector 57, a two-divided PIN photodiode can be used which has a separation line extending parallel to the knife edge.

Figure 54:
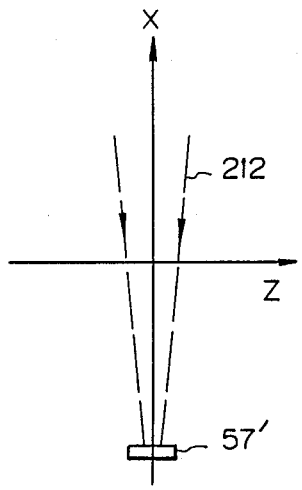
FIG. 54 is a view showing the detection of a signal beam when information is written and erased.

FIG. 54 shows a detection method of the first signal beam at the erasure of information. In this case, the first signal beam 212 caused by the first incident beam 210 issued from the first LD1 is used.

It is considered that, in case of a two-beam pickup, it is sufficient to detect the signal beam only by tracking when the information is written (recorded) or erased.

Accordingly, it is not necessary to divide the first signal beam 212 diffracted by the second section 11B1 of the first grating lens 11 into two beams. specifically, the first signal beam 212 can be directly introduced to the tracking photodetector 57', which corresponds to the photodetector 205 shown in FIG. 45. The photodetector 57' is comprised of a two-divided PIN photodiode similar to the photodiode shown in FIGS. 52 and 53A.

Figure 55:
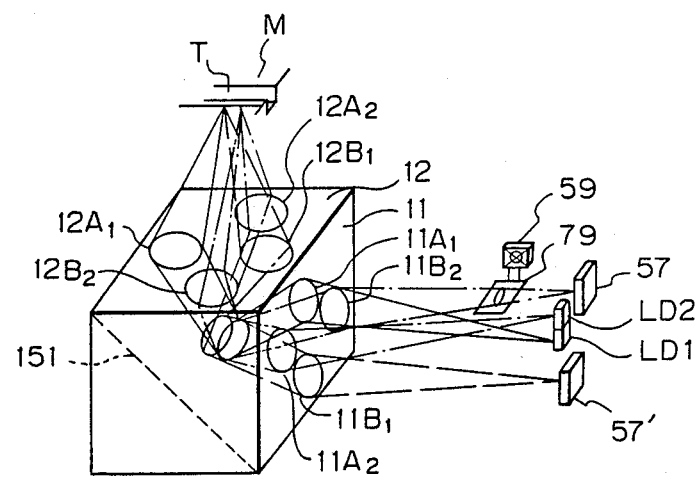
FIG. 55 is a perspective view of an actual arrangement of a two-beam type of optical pickup.

FIG. 55 shows an example of an actual construction of the two-beam type optical pickup mentioned above.

In FIG. 55, the first grating lens 11 and the second grating lens 12 are located so that the optical axes thereof are normal to each other and a mirror 151 is provided between the first and second grating lenses 11 and 12. Namely, the beams issued from the first grating lens 11 are bent by 90° by the mirror 151 toward the second grating lens 12 and vice versa. The arrangement in which the first grating lens 11 and the second grating lens 12 are perpendicular to each other contributes to a reduction of the thickness of the pickup in the direction perpendicular to the plane of the disk M, similar to the embodiments shown in FIGS. 29, 31, 32, etc. "T" in FIG. 55 shows a track of the disk M.

Figure 56:
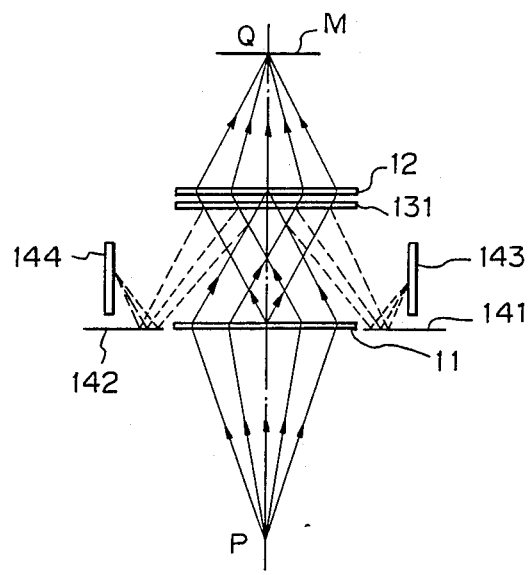
FIG. 56 is a schematic view of an optical pickup according to a modified embodiment.

FIG. 56 shows an optical pickup according to another aspect of the present invention, in which the improvement is directed to effective utilization of the space between the two grating lenses 11 and 12, which must be spaced at the distance d from each other, as mentioned above.

Namely, in the embodiment shown in FIG. 56, the optical elements, such as photodetectors and half mirrors, etc. are all located in a space defined by and between the grating lenses 11 and 12.

In FIG. 56, a third hologram 131 is provided between the first grating lens 11 and the second grating lens 12 to split outward the signal beam reflected at the point Q on the disk M into two beams. The hologram 131 functions as a half-mirror or polarizing beam splitter (PBS).

The beam issued from the point P (semiconductor laser LD) is converged upon the focal point Q on the disk M by the first and second the grating lenses 11 and 12, as mentioned before. A part of the incident beam is transmitted through the hologram 131 and is then diffracted by the second grating lens 12 to be converged upon the point Q on the disk M, as mentioned above. The signal beam reflected at the point Q is returned to the point P along the same path as the inward path in the opposite direction. The signal beam is partly transmitted through and partly diffracted by the hologram 131. The diffraction angle of the hologram 131 is designed so that the diffraction beams are directed outward with respect to the optical axis. For example, the first order diffraction beams are reflected by mirrors 141 and 142 which are located on the same plane as the first grating lens 11. Between the first and second grating lenses 11 and 12 are provided photodetectors 143 and 144 which are made of, for example, PIN photodiodes, similar to the aforementioned embodiments. The hologram 131 has at least two hologram sections having different spatial frequency distributions. Note that "between the first and second grating lenses" referred to herein includes a space defined by the extensions of the planes of the first and second grating lenses 11 and 12.

Figure 57:
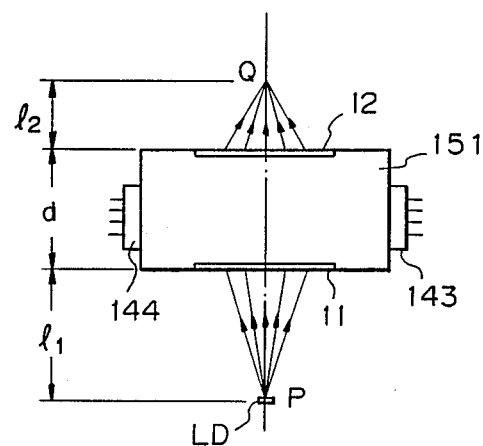
FIG. 57 is a view showing an outer appearance of an optical pickup shown in FIG. 56.

With the arrangement shown in FIG. 56, the signal beams are grated between the first and second grating lenses 11 and 12. The optical elements, except for the light source, such as LD, can be all located between the first and second grating lenses, resulting in a compact and thinner pickup. FIG. 57 shows the appearance of the pickup shown in FIG. 56. The optical principle of the pickup shown in FIG. 57 is quite the same as that shown in FIG. 1. In FIG. 57, numeral 151 designates a transparent body, such as a glass plate, which has on its opposite sides the first and the second grating lenses 11 and 12 and which has on its other opposite sides the photodetectors 143 and 144.

Figure 58:
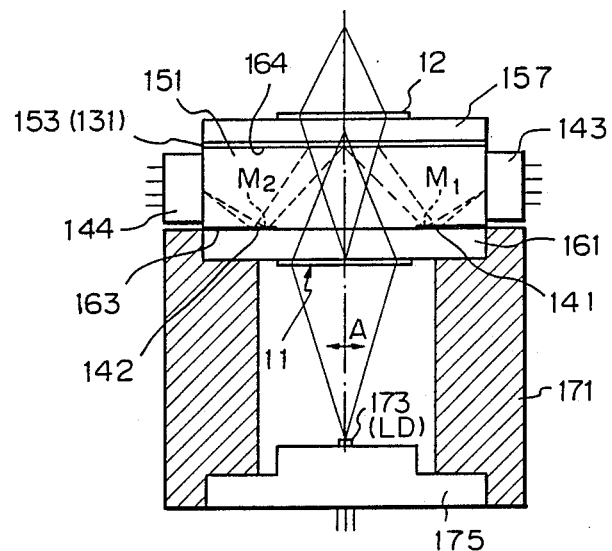
FIG. 58 is a partial sectional view of an optical head having an optical pickup shown in FIG. 57.

FIG. 58 shows an actual construction of an optical pickup which has the grating lens system illustrated in FIG. 56 incorporated therein. In FIG. 58, the transparent body (first substrate) 151 has on its one side face reflecting layers M1 and M2, which form the reflecting mirrors 141 and 142, and on its opposite side face a recording medium 153 which forms the hologram 131. The transparent body 151 can be made of, for example, polished BK 7 which is a glass material with parallel side faces. The reflecting mirror layers M1 and M2 can be made of, for example, vapor-deposited aluminum. The hologram recording medium 153 is preferably a material of which a volume hologram is made, such as photopolymer, since a $\frac{1}{4}\lambda$ plate 157 is directly secured thereto, as will be explained hereinafter.

The first grating lens 11 can be formed on a second transparent body 161 (e.g., BK 7) similar to the first transparent body 151 by electron beam writing or holographic process or another known process. The second transparent body (second substrate) 161 can be directly secured to the reflecting layers (surfaces) M1 and M2 of the first transparent substrate 151 by means of an adhesive 163 or the like. To the side face of the first substrate 151 on which the recording medium 153 is formed is secured a third transparent substrate 157 which is in the form of a $\frac{1}{4}\lambda$ plate in the illustrated embodiment and which has the second grating lens 12 integral therewith on one side face of the third substrate, by means of an adhesive 164 or the like. The second grating lens 12 can be formed on the third substrate 157 by a similar process to that of the first grating lens 11. The $\frac{1}{4}\lambda$ plate 157 has good parallel side faces.

The signal beam splitting hologram 131 may be merely a beam splitter but preferably is a polarizing beam splitter (PBS). Such a hologram 131 can be made, for example, by copying a master hologram which is in turn made, for example, by electron beam writing, an interference exposure process, or the like in a coherent copying process.

Figure 59:
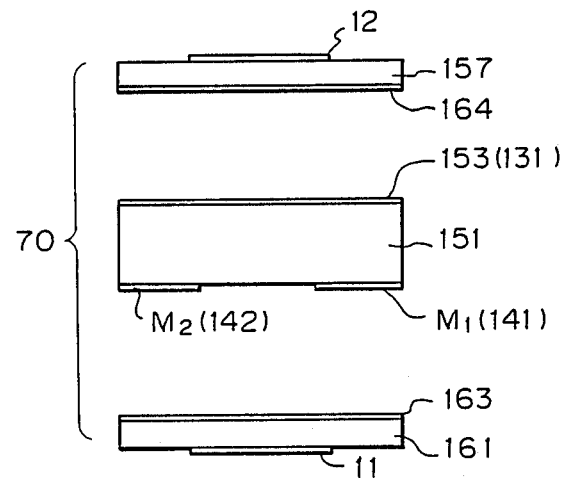
FIG. 59 is an exploded view of optical components of an optical head shown in FIG. 58.

The three substrates 151, 157, and 161 are secured together by means of the adhesives 163 and 164, such as UV curable adhesives, after they are aligned on the optical axis (FIG. 59). The photodetectors 143 and 144 are secured to the opposite end faces of the first substrate 151. The assembly 70 (FIG. 59) thus obtained is secured to one end face of a hollow tubular housing 171, as can be seen in FIG. 58.

To the opposite end face of the housing 171 is secured a heat sink 175 which has a laser beam source, such as a semiconductor laser 173 (LD). It goes without saying that the LD 173 is aligned on the optical axis and is spaced at a predetermined distance from the assembly 70.

The positional adjustment of the LD 173 can be effected while observing the beam spot on the point Q of the disk M converged by the second grating lens 12. The positional adjustment of the photodetectors 143 and 144 can be effected by statically creating the signal beam (reflection beam) while observing an error signal. Preferably, the housing 171 is connected to an actuator, as shown in FIG. 15 or 21, so that the entirety of the optical system can be moved in predetermined directions, including rotational, similar to the actuation of a conventional objective.

Figure 60:
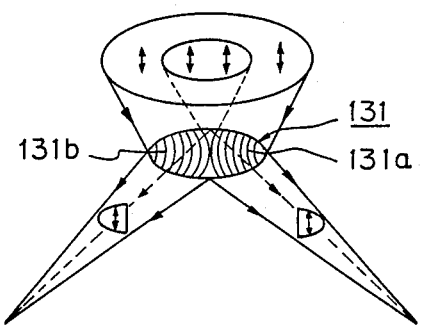
FIG. 60 is a view showing a function of a hologram for splitting a signal beam in an optical head shown in FIG. 58.

FIG. 60 shows a function of the PBS hologram 131 shows in FIG. 58.

The hologram 131 is divided into two sections 131a and 131b having different holograms. The hologram sections 131a and 131b diffract the beam outward far from the optical axis in the opposite directions and converge the beam upon predetermined points, respectively.

The rays of the signal beam travelling toward the first grating lens 11 from the second grating lens 12 form a conical generatrix on the circular band above the second grating lens 12.

The hologram 131 is divided into two sections 131a and 131b by a separation line including the center thereof, as mentioned above. The respective hologram sections 131a and 131b diffract the beams outward far from the optical axis toward the respective mirrors (reflecting layers) M1 and M2, so that the beams are converged upon the respective photodetectors 143 and 144. To increase the sensitivity of the detection of the signal error, it is desirable to have a longer focal length of the convergency beam (NA≦1/10). The intervention of the mirrors M1 and M2 between the hologram 131 and the respective photodetectors 143 and 144 satisfies the requirement of the increase of the focal length mentioned above without substantially increasing the distance d between the first and second grating lenses 11 and 12.

The PBS hologram 131 transmits only a linearly polarized beam having a specific direction and diffracts the linearly polarized beam having a direction perpendicular thereto, as is well known. For instance, in the illustrated embodiment, the PBS hologram 131 transmits only the P-polarized beam and diffracts the S-polarized beam.

The interference fringes of the hologram 131 substantially extend in the direction of the separation line 130 (FIG. 61) of the two sections 131a and 131b of the hologram 131.

Accordingly, the beam which is incident upon the hologram 131 is an S-polarized beam over almost all the hologram area, so that the signal beam can be effectively split, as will be explained hereinafter.

The beam of spherical wave (which is supposed to have a polarization in a direction designated by an arrow A in FIG. 58) issued from the LD 173 is diffracted by the first grating lens 11 to intersect on the optical axis, as mentioned above. Since the PBS hologram 131 has interference fringes substantially perpendicular to the sheet of the drawing in FIG. 58, the semiconductor laser beam incident upon the hologram 131 is almost a P-polarized beam. As a result, the hologram 131 transmits the laser beam (P-polarized beam), so that the transmission beam comes to the $\frac{1}{4}\lambda$ plate 157. The linearly polarized beam incident upon the $\frac{1}{4}\lambda$ plate is converted to the circularly polarized beam thereby and reaches the second grating lens 12. The second grating lens 12 converges the beam upon the focal point Q on the disk M to create a small beam spot. In this embodiment, the fluctuation of the wavelength of the laser beam can be effectively absorbed by the grating lens assembly according to the present invention.

The signal beam which is reflected at the point Q travels on the same path as that of the inward beam from the point P to the point Q until the signal beam reaches the $\frac{1}{4}\lambda$ plate 157. When the signal beam passes through the $\frac{1}{4}\lambda$ plate 157, it is converted to the linearly polarized beam which has a polarization angle different by 90° from that of the linearly polarized inward beam. Namely, the outward beam (signal beam) which has passed the $\frac{1}{4}\lambda$ plate 157 is an S-polarized beam. As a result, the S-polarized beam is diffracted and split by the two sections 131a and 131b of the PBS hologram 131. The split signal beams are reflected by the mirrors M1 and M2 which are located on the same plane as the first grating lens 11 to be converged upon the photodetectors 143 and 144.

Figure 61:
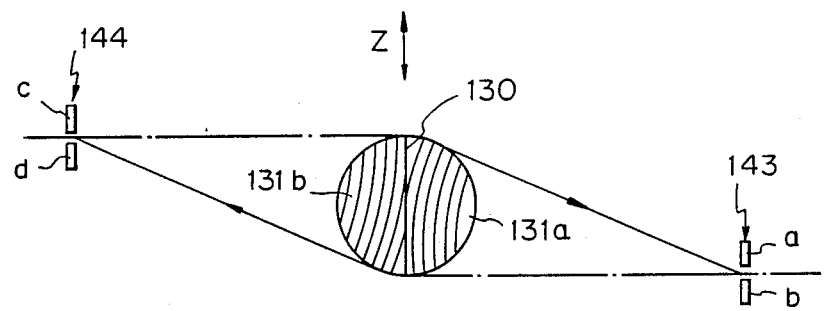
FIG. 61 is a view showing the detection of focusing and tracking beams in an optical head shown in FIG. 58.

FIG. 61 shows the detection method of the photodetectors 143 and 144 shown in FIG. 58. The focusing error and the tracking error can be detected by the outputs of the photodetectors 143 and 144, as mentioned before.

The photodetectors 143 and 144 are both two-divided PIN photodiodes in the illustrated embodiment. The focusing can be performed, for example, by a method equivalent to the knife edge method, and the tracking can be performed, for example, by a push-pull method, mentioned before.

Note that, in FIG. 61, the direction of the track of the disk M corresponds to the direction Z.

Supposing that the outputs of the two photodiodes of each of the photodetectors 143 and 144 are a, b and c, d, respectively, the focusing error can be detected by $\{(a-b)+(d-c)\}$ and the tracking error can be detected by $\{(a+b)-(c+d)\}$.

The detection of the focusing error and tracking error are well known and accordingly no detailed explanation is given herein.

Figure 62:
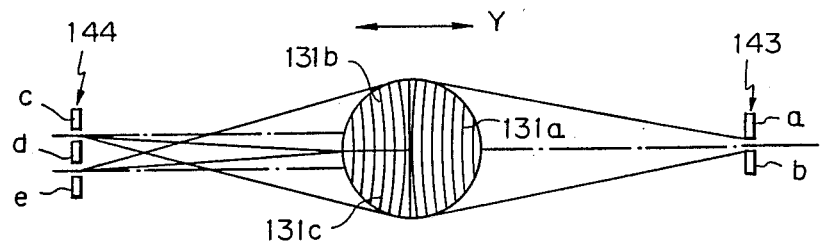
FIG. 62 is a view showing another method of detection of focusing and tracking beams in an optical head shown in FIG. 58.

FIG. 62 shows a variant of the PBS hologram 131, in which the hologram 131 is divided into three sections 131a, 131b, and 131c having different holograms. Accordingly, the photodetector 144 is a three-divided PIN photodiode, outputs of which are designated by c, d, and e in FIG. 62. The focusing error and the tracking error can be detected similarly to the embodiment shown in FIG. 61. It should be appreciated that in the embodiment shown in FIG. 62, the focusing error and the tracking error can be independently detected. Namely, the focusing can be effected by the photodetector 144 and the tracking by the photodetector 143.

In this case, the tracking error is detected by the difference (a−b) in output between the two photodiodes of the photodetector 143 and the focusing error is detected by the difference {d−(c+e)} in output between the three photodiodes of the photodetector 144. According to the embodiment shown in FIG. 62, there is no crosstalk between the photodetectors 143 and 144, since the focusing and tracing can be independently effected. In FIG. 62, the track direction corresponds to the direction Y.

Figure 63:
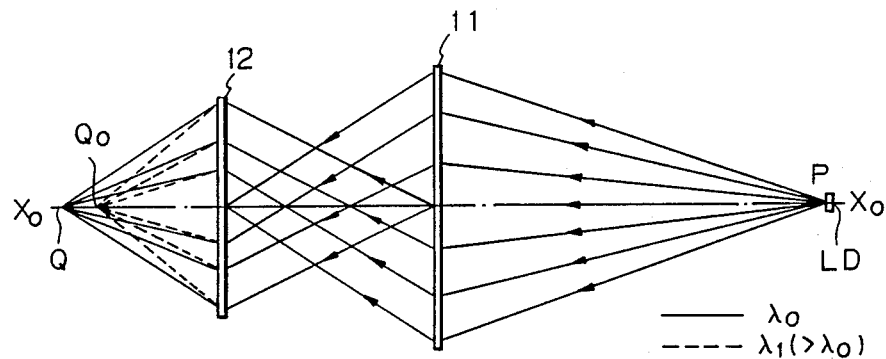
FIG. 63 is a view of a grating lens assembly used in a focusing device according to the present invention.
Figure 64:
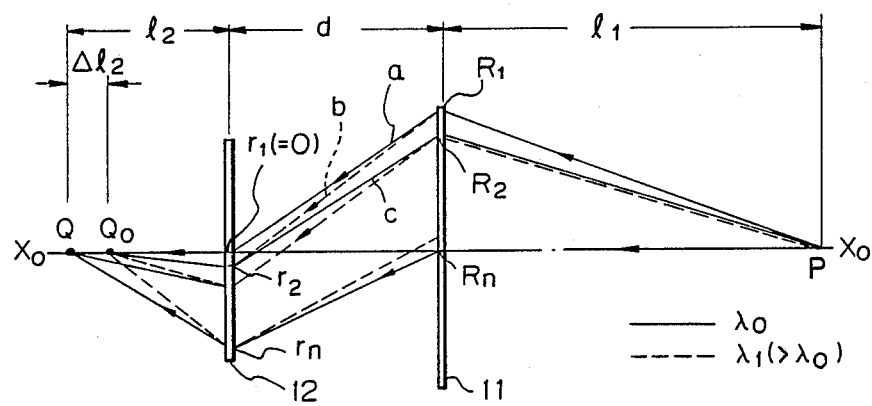
FIG. 64 is a view showing how to determine spatial frequencies of grating lenses used in a grating lens assembly shown in FIG. 63.

FIGS. 63 and 64 show an embodiment in which the grating lens assembly of the present invention is applied to a focusing device.

The optical principle of the embodiment shown in FIGS. 63 and 64 is substantially identical to that of the embodiment shown in FIGS. 1 and 2.

In FIGS. 63 and 64, the rays of the laser beam (wavelength $\lambda_0$) issued from the LD (point P) are diffracted in symmetry of revolution to intersect, the optical axis and reach the first grating lens 11. The beam is then diffracted by the second grating lens 12 to be converged upon a predetermined point Q in accordance with the spatial frequency thereof, as mentioned before with reference to FIGS. 1 and 2.

When the wavelength $\lambda_0$ of the incident laser beam is changed to $\lambda_1$ (e.g., $>\lambda_0$), it is possible to converge the beam upon a point $Q_0$ different from the point Q without aberration by properly determining the spatial frequency distributions of the first and second grating lenses 11 and 12, as will be explained below in detail.

As the laser beam source LD, there can be used a tunable laser, which is per se known, and which can vary the wavelength of the emitting beam.

FIG. 64 shows how to determine the spatial frequencies of the first and second grating lenses 11 and 12. In principle, the spatial frequencies of the grating lenses 11 and 12 can be determined by similar processes as mentioned before with reference to FIG. 1.

Accordingly, the following explanation of the processes for determining the spatial frequencies of the grating lenses 11 and 12 shown in FIGS. 63 and 64 will be brief.

In FIG. 64, supposing a beam a of a wavelength $\lambda_0$ which is issued from the point P and which reaches the outermost peripheral point R1 of the first grating lens 11 which is spaced from the point P at a distance $l_1$, the beam a is diffracted at the point R1 toward the center point r1 of the second grating lens 12. Then, the beam a is diffracted by the second grating lens 12 to be converged upon the point Q. The spatial frequencies F1 and f1 at the points R1 and r1 are determined by supposing the path of P→R1→r1→Q.

Next, supposing that the wavelength is changed from $\lambda_0$ to $\lambda_1$ ($>\lambda_0$), the beam which travels from the point P to the point R1 is diffracted at the point R1 in a different direction with a different diffraction angle from the wavelength $\lambda_0$, so that the beam comes to the point r2 of the second grating lens 12, different from the point r1 (beam b).

From the condition that the beam of wavelength $\lambda_1$ is converged upon a point $Q_0$ which is spaced at a distance $\Delta l_2$ from the point Q, the spatial frequency f2 at the point r2 can be determined. A beam c of a wavelength $\lambda_0$ which is diffracted at the point r2 to be converged upon the point Q is taken into consideration again to determine a position R2 of the first grating lens 11 from which the beam c is emitted. After that, from the condition that the diffraction beam at the point R2 is emitted from the point P, a spatial frequency F2 at the point R2 can be determined. Next, by supposing a beam of a wavelength $\lambda_1$ which is diffracted at the point R2, a third point r3 (not shown) of the second grating lens 12 which the beam reaches and a spatial frequency F3 can be determined. By taking a beam of a wavelength $\lambda_0$ into consideration again, a third point R3 (not shown) on the first grating lens 11 and a spatial frequency F3 thereat can be determined, similarly to the above.

The above process is repeated until the point Rn (n =1, 2, 3, . . . ) comes to the center of the first grating lens 11, so that spatial frequency distributions of the first and second grating lenses 11 and 12 can be determined. The radius of the second grating lens 12 can be determined in accordance with the value of rn, corresponding to the point Rn of the first grating lens 11.

It should be noted that FIG. 64 shows a cross-section including the optical axis and that the lenses themselves are symmetrical with respect to the optical axis.

As can be seen from the foregoing, it is possible to converge the beam which is issued from the point P upon the point $Q_0$, different from the point Q, without aberration when the wavelength is changed.

It is also possible to move the focal point in accordance with the change of the wavelength. Namely, it is possible to control the focal length by changing the wavelength of the emitting beam.

Figure 65:
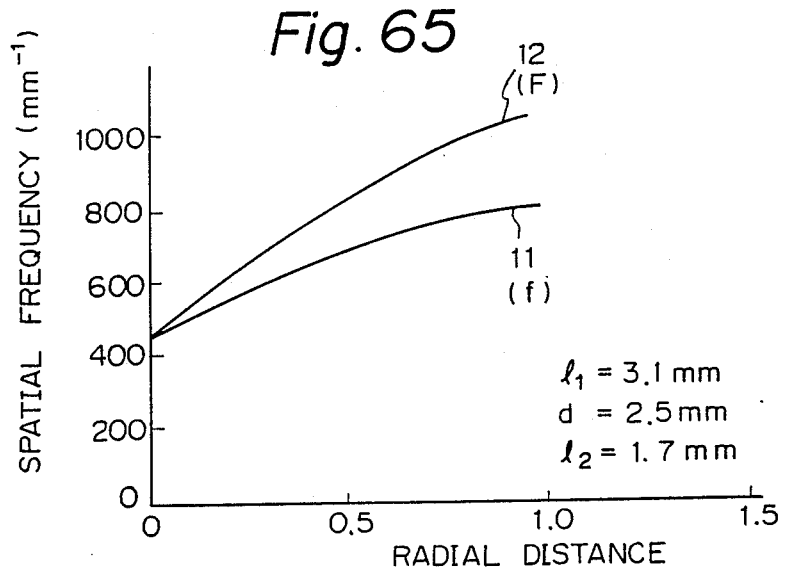
FIG. 65 is a diagram showing a distribution of spatial frequencies of grating lenses shown in FIG. 64.

FIG. 65 shows an example of radial spatial frequency distributions of the grating lenses 11 and 12 determined by the above-mentioned processes. In FIG. 65, the numerical apertures of the first grating lens 11 and the second grating lens 12 were 0.3 and 0.5, respectively, and $l_1=3.1$ mm, $\alpha=2.5$ mm, $l_2=1.7$ mm, $\lambda_0=830$ mm, $\lambda_1=830.3$ nm, and $\Delta l_2$ ($=Q-Q_0$) $=0.3$ μm. Note that the wavelength difference ($\lambda_1-\lambda_0=0.3$ nm) corresponds to one mode of the semiconductor laser.

Figure 5:
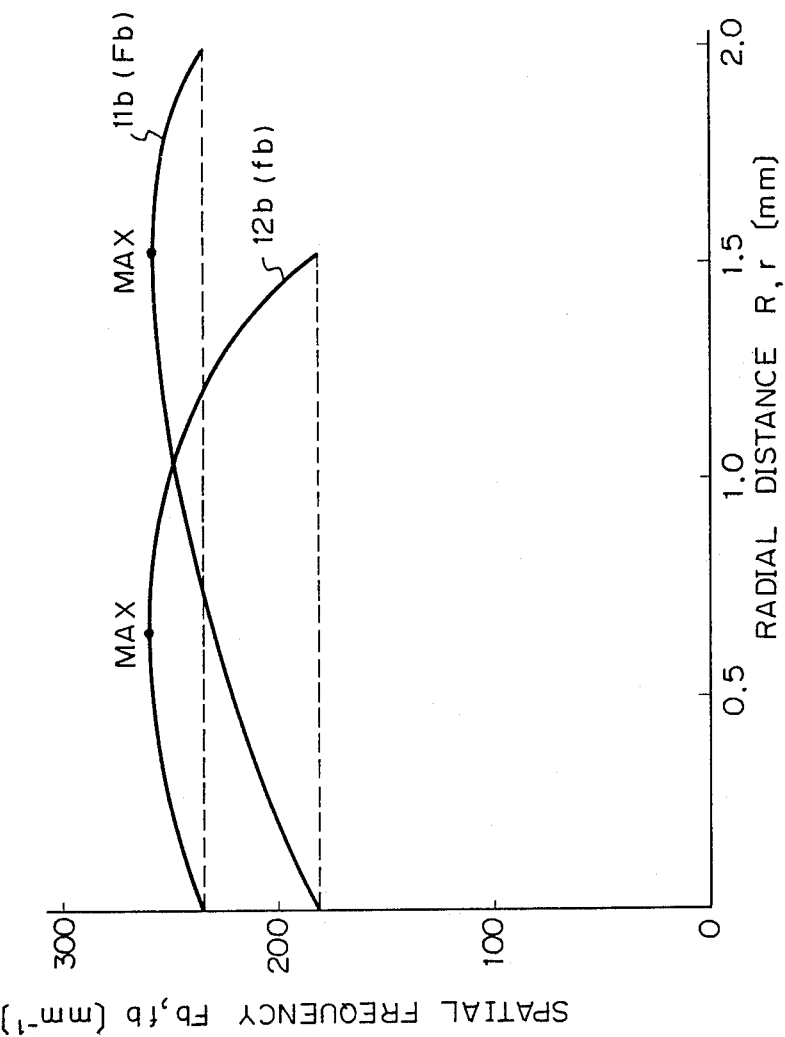
FIG. 5 is a diagram of an example of spatial frequencies of grating lenses shown in FIG. 4.

The characteristics of the grating lenses 11 and 12 shown in FIGS. 4, 5, and 6 are applicable to the embodiment shown in FIGS. 64 and 64.

Figure 66:
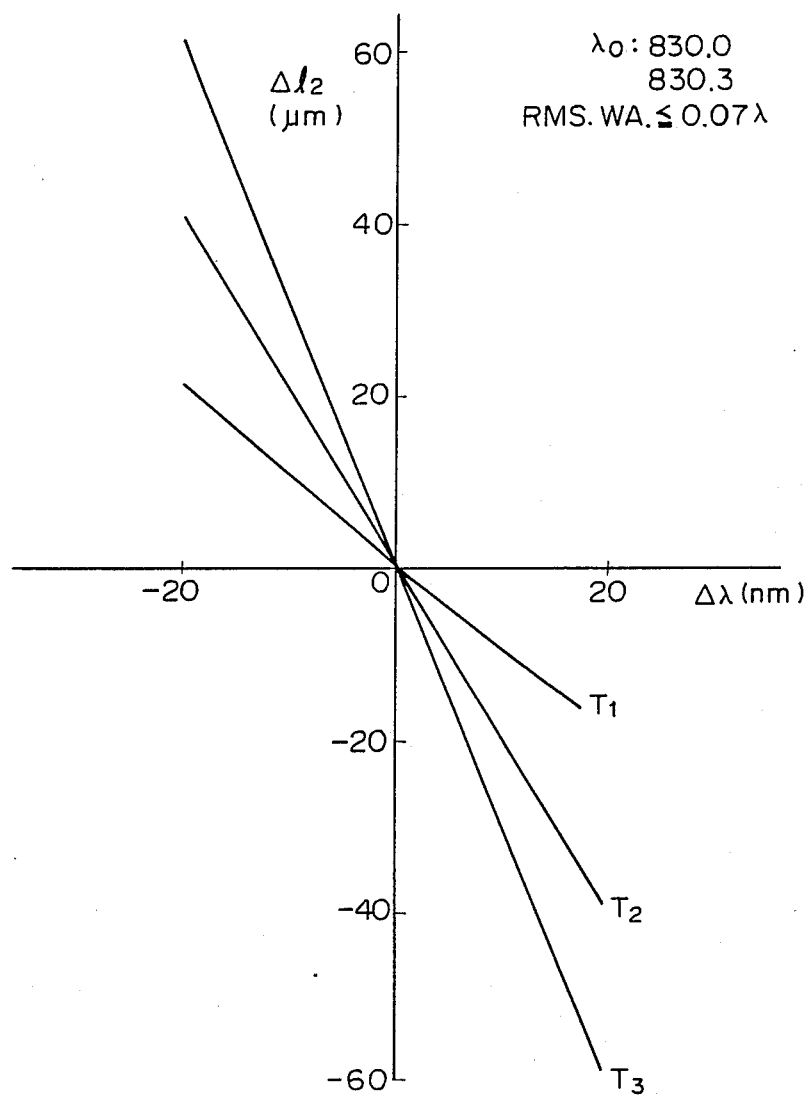
FIG. 66 is a diagram showing a relationship between a change in wavelength and displacement of a focal point in a focusing device shown in FIG. 64.

FIG. 66 shows the relationship between the variation $\Delta\lambda$ (nm) of wavelength and the displacement $\Delta l_2$ (μm) of the focus, in an embodiment shown in FIG. 63.

In FIG. 66, "T1" represents that when the wavelength varies by 1 nm, the focus moves by 1 μm. "T2" and "T3" represent that when the wavelength varies 1 nm, the focus moves 2 μm and 3 μm, respectively. According to the results shown in FIG. 66, "T1" teaches that the variations of the wavelength and the displacement of focus is approximately 1:1. It can be confirmed from FIG. 66 that the focus can be moved by varying the wavelength with a predetermined relationship. Namely, according to the embodiment shown in FIG. 63, the focus can be controlled by varying the wavelength of the emitting beam.

Figure 67:
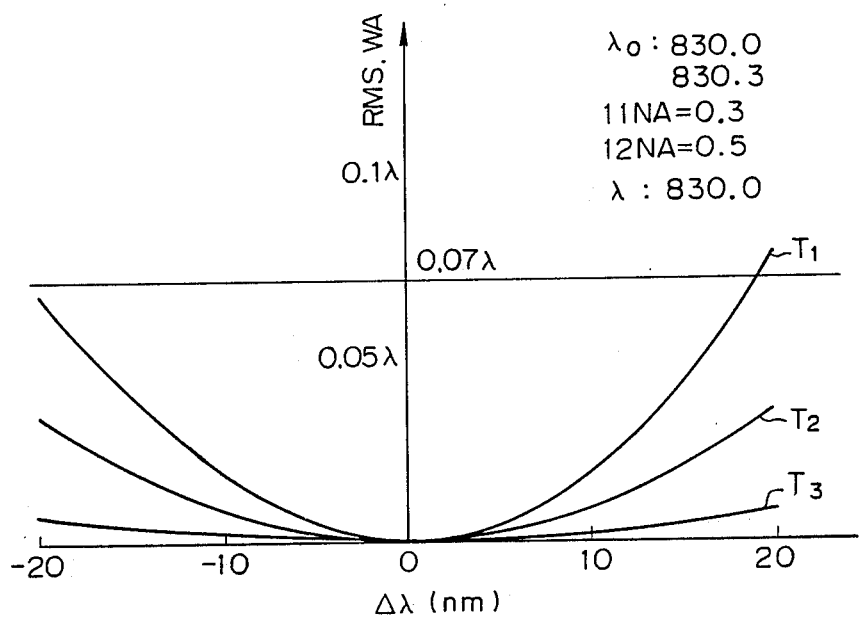
FIG. 67 is a diagram showing a relationship between an RMS wavefront aberration and a change of wavelength in a focusing device shown in FIG. 64.

To confirm the usefulness of the present invention, the moved focus must be without aberration. To confirm that the focus does not substantially have aberration wherever it moves, calculations were made to obtain the RMS value of wavefront aberration which was caused when the wavelength of the laser beam was changed from 830 nm, for each of "T1", "T2", and "T3", shown in FIG. 66. The results are shown in FIG. 67. In the calculation, the spatial frequency distributions of the grating lenses 11 and 12 were designed so that the center wavelengths at which no aberration takes place were 830 nm and 830.3 nm, respectively.

In FIG. 67, the abscissa designates the displacement $\Delta\lambda$ (nm) of focus, and the ordinate designates the RMS wavefront aberration (RMS.WA). Similar to FIG. 13, Marechal's Criterion (RMS. WA $\lesssim 0.07 \lambda$) can be considered a reference below which substantially no aberration takes place. From Marechal's Criterion, an allowable fluctuation range of wavelength can be obtained. Namely, $\Delta\lambda = \pm 18$ nm for "T1", $\Delta\lambda = \pm 20$ nm for "T2", and $\Delta\lambda = \pm 20$ nm for "T3" are allowable ranges in which substantially no aberration occurs, according to the experimental results shown in FIG. 67. It can be also seen that as "T" becomes large, i.e., as the displacement of focus relative to a unit variation (1 nm) of wavelength becomes large, the RMS.WA decreases.

As can be seen from the foregoing, according to the present invention, the focus can be moved without aberration by varying the wavelength. It should be appreciated that no mechanical drive is necessary for controlling the focus, since the control can be effected only by varying the wavelength of the emitting beam. In particular, if a tunable laser, available on the market, is used as the laser beam source, the control of the focus becomes simpler, since the tunable laser can vary the wavelength of the laser beam emitted therefrom.

Figure 83:
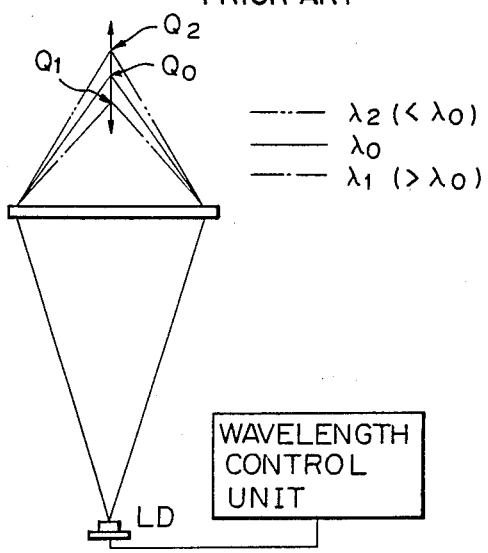
FIG. 83 is a view of a known focus-servo system.

FIG. 83 shows a known focus controlling servo system, in which the wavelength of the beam emitted from a semiconductor laser LD is controlled by a wavelength control unit, in accordance with an focus error of the convergence beam, to move the focus from the point $Q_0$ to $Q_1$ or $Q_2$, as disclosed in Japanese Unexamined Patent Publication (Kokai) No. 60-66337. However, in this known system, aberration occurs when the wavelength of the beam is varied, resulting in difficulty in accurately reading the signal beam.

It is possible to increase the efficiency of the grating lenses 11 and 12 by blasing them, as is well known.

Figure 68:
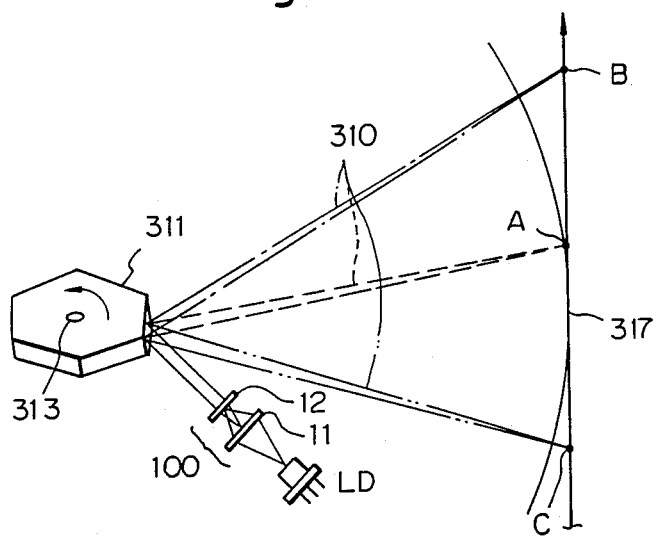
FIG. 68 is a perspective view of an optical scanning device according to the present invention.

FIG. 68 shows an application of the focusing apparatus shown in FIGS. 63 and 64 to a beam scanning apparatus.

Figure 84:
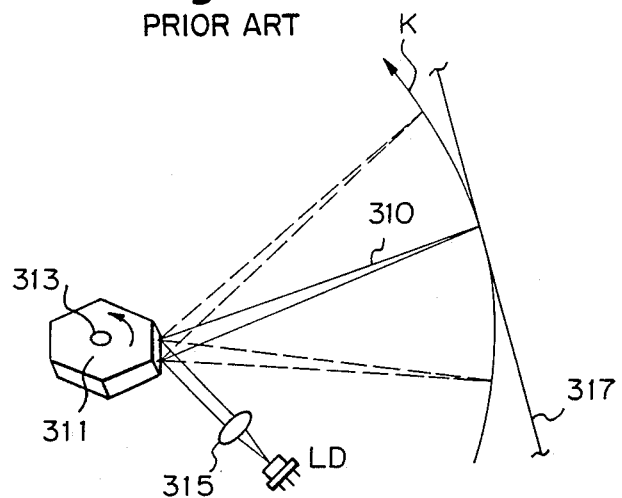
FIG. 84 is a perspective view of a known beam scanning device.
Figure 85:
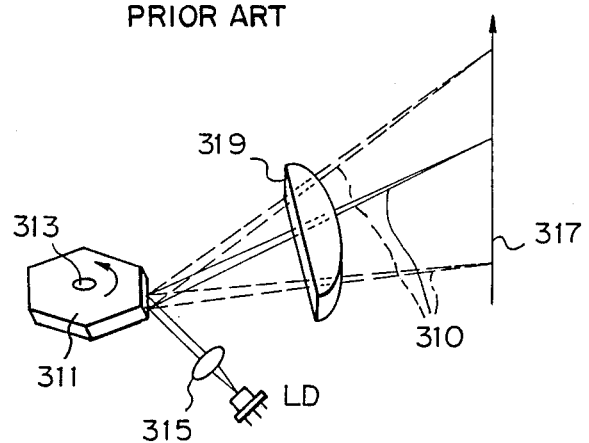
FIG. 85 is a view similar to FIG. 84 but showing another known beam scanning device.

Before considering the scanning device of the present invention, it is helpful to review the known focusing apparatuses shown in FIGS. 84 and 85. In FIG. 84, a polygonal mirror 311 rotates about a shaft 313 to scan the beam 310 which is issued from the semiconductor laser LD and which is converted to a converging beam with long focul length by a lens 315. In this scanning method, the scanning beam 310 is imaged on and along a circular track K which is a part of a circle having a center on the associated reflecting surface of the polygonal mirror 311. Accordingly, for example, when the scanning system is used for a laser printer in which the scanning beam must be scanned along and on a straight surface of a recording drum 317, no exact small beam spot can be converged on the drum.

To solve the problem mentioned above, it is also known to use an f-$\theta$ lens 319, which enables the scanning beam 310 to be imaged on the straight surface of the drum. However, such an f-$\theta$ lens 319 is very expensive and requires high skill for manufacture.

Looking again at FIG. 68, according to the present invention, the scanning beam 310 can be exactly focused on and along the straight line of the drum 317 by using the focusing apparatus shown in FIGS. 63 and 64.

Figure 69:
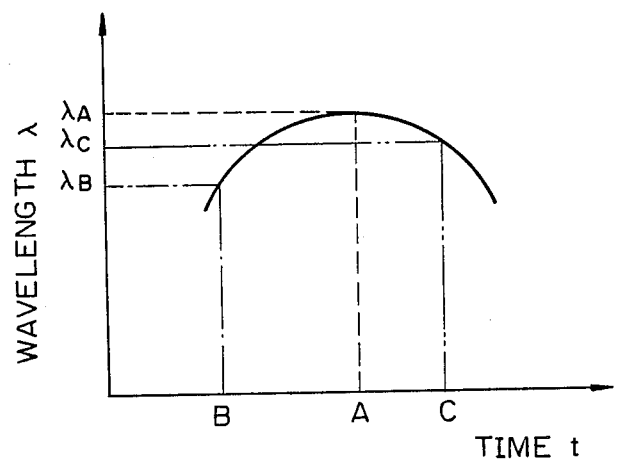
FIG. 69 is a diagram showing a relationship between wavelength and time in an optical scanning device shown in FIG. 68.

Namely, the wavelength of the laser beam issued from the LD is controlled, for example, by a curve shown in FIG. 69. In FIG. 69, the abscissa designates the time t and the ordinate designates the wavelength $\lambda$. $\lambda_A$, $\lambda_B$, and $\pi_C$ are wavelengths at the points A, B, and C on the straight line of the drum 317 shown in FIG. 68.

Between the LD and the polygonal mirror 311 is provided a grating lens assembly 100 having the first and second grating lenses 11 and 12 shown in FIG. 63, so that when the wavelength of the laser beam varies, no aberration occurs, as mentioned before.

Figure 70:
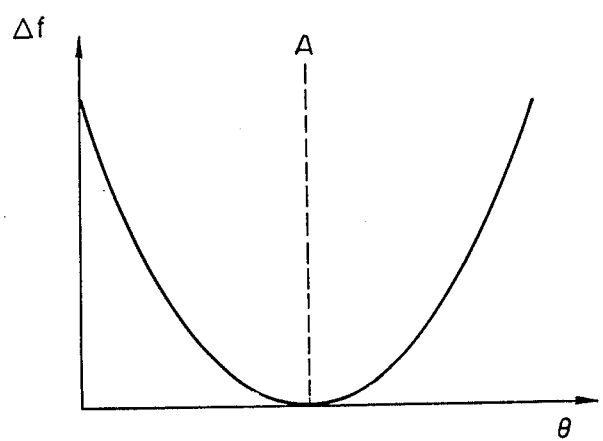
FIG. 70 is a diagram showing a relationship between angular displacement of a polygonal mirror and change in a focal length in an arrangement shown in FIG. 68.
Figure 71:
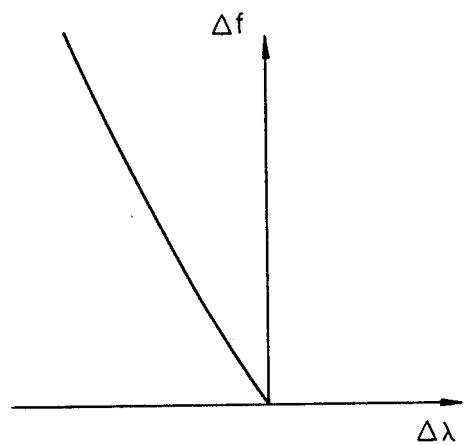
FIG. 71 is a diagram showing a relationship between change of wavelength and change of focal length in a scanning device shown in FIG. 68.
Figure 72:
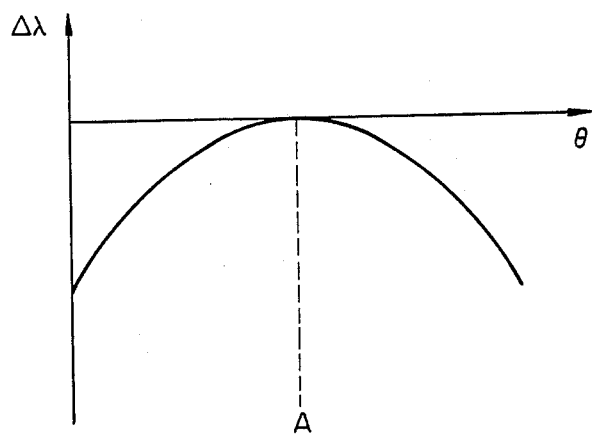
FIG. 72 is a diagram showing a diagram of a relationship between change of wavelength and angular displacement of a polygonal mirror in a scanning device shown in FIG. 68.

FIG. 70 shows the general relationship between the angular displacement $\theta$ (abscissa) of the polygon mirror 311 and the variation of the focus (focal length) $\Delta f$. "A" in FIG. 70 corresponds to the point A in FIG. 68. FIG. 71 shows the general relationship between the variation $\Delta f$ (abscissa) of wavelength and the variation $\Delta\lambda$ (ordinate) of a focus, from which it can be seen that there is a linear relationship between $\Delta\lambda$ and $\Delta f$. From FIGS. 70 and 71, the relationship between the angular displacement $\theta$ of the polygon mirror 331 and the variation $\Delta\lambda$ of the wavelength can be obtained, as shown in FIG. 72. In FIG. 72, "A" corresponds to the center point A in FIG. 68.

As a result, according to the present invention, the beam can be constantly focused on a predetermined pattern (e.g., straight line) by controlling the wavelength of the beam, thereby to control the focus, without using a mechanical drive or actuator for varying the focus.

As can be seen from the foregoing, according to the present invention, the grating lens assembly having the first and second grating lenses with predetermined spatial frequency distribution is not sensitive to fluctuation of the wavelength of the used beam. Accordingly, no aberration and no deviation of the focal point occur even if the wavelength varies.

We claim:

1. An optical system having a grating lens assembly comprising:
    a first grating lens having an optical axis and which diffracts rays of beam incident thereupon so as to provide non-parallel diffraction rays which cross the optical axis and is capable of imparting certain dispersion and
    a second grating lens having an optical axis and which converges the non-parallel diffraction rays with a predetermined pattern substantially without aberration, and is capable of cancelling out the dispersion imparted by the first lens.

2. An optical system according to claim 1, wherein said first and second grating lenses are in-line grating lenses which are located on the same optical axis.

3. An optical system according to claim 2, wherein said first and second grating lenses are spaced from one another at a predetermined distance in a parallel arrangement.

4. An optical system according to claim 3, wherein said first grating lens has a predetermined spatial frequency distribution with a symmetry of revolution with respect to the optical axis, causing the diffraction rays of a beam from any two points symmetrical with respect to the optical axis on the first grating lens to intersect on the optical axis, and said second grating lens has a predetermined spatial frequency distribution with symmetry of revolution with respect to the optical axis, converging the diffraction beam of the first grating lens upon a predetermined point substantially without aberration.

5. An optical system according to claim 4, wherein the spatial frequency distributions of the first and second grating lenses comprise spatial frequency distributions for converging a beam of plane wave plus spatial frequency distributions which are of symmetry of revolution with respect to the optical axis and which have maxima between centers and peripheral portions of the associated grating lenses.

6. An optical system according to claim 1, wherein said first and second grating lenses have predetermined spatial frequency distributions in which the spatial frequencies smoothly increase from the centers toward the peripheral portions of the associated gratings, so that variation of diffraction angles of the first grating lens in accordance with fluctuation of the wavelength of the incident beam upon the first grating lens can be absorbed.

7. An optical system according to claim 6, wherein said second grating lens has a predetermined spatial frequency distribution which has a spatial frequency distribution for converging a beam of plane wave plus a spatial frequency distribution in which the spatial frequency gradually decreases from the center toward peripheral portion of the second grating lens.

8. An optical system according to claim 7, wherein said spatial frequency distribution of the second grating lens equal to the spatial frequency distribution of the first grating lens.

9. An optical system according to claim 1, wherein a coherent beam of a spherical wave is incident upon the first grating lens.

10. An optical system according to claim 1, wherein a coherent beam of a plane wave is incident upon the first grating lens.

11. An optical system according to claim 1, further comprising a transparent body which has parallel side faces on which said first and second grating lenses are integrally formed.

12. An optical system according to claim 11, comprising an array arrangement which has a plurality of said grating lens assemblies.

13. An optical system according to claim 11, further comprising a cylindrical housing in which said grating lens assembly with the transparent body is secured and a semiconductor laser which is located and secured in the housing so as to be coaxial with the grating lens assembly.

14. An optical system according to claim 11, further comprising a third grating lens which is provided on the side face of the transparent body on which the third grating lens is provided to surround the first grating lens, half reflecting means for partly reflecting and partly transmitting a beam in the transparent body behind the first grating lens as viewed in a direction of a beam incident upon the first grating lens, said means being provided with a reflecting surface facing the second grating means, means in the transparent body for reflecting the beam reflected by the half reflecting means toward the third grating lens, and detecting means outside the transparent body for detecting reflection beams which are reflected at the predetermined point on which the beam is converged by the second grating lens.

15. An optical system according to claim 14, wherein said reflecting means comprises an annular reflecting mirror which has a center opening through which the diffraction beams between the first and second grating lenses pass.

16. An optical system according to claim 14, wherein said half reflecting means comprises aluminum layer which is vapor-deposited on said transparent body.

17. An optical system according to claim 1, further comprising a laser beam source, polarizing beam splitting means between the laser beam source and the first grating lens, a ¼ wave plate between the polarizing beam splitting means and said predetermined point upon which the diffraction beam of the second grating lens is converged, and detecting means for detecting a reflection beam which is reflected at said predetermined point, wherein said polarizing beam means transmits an inward beam which is issued from the laser beam source to be incident upon the first grating lens and the reflection beam which is reflected at said predetermined point and which travels on the same path as that of the inward beam in the grating lens assembly and reflects the other reflection beam or inward beam toward the detecting means.

18. An optical system according to claim 17, wherein said detecting means comprises at least one photodetector.

19. An optical system according to claim 17, wherein said first and second grating lenses are located to be perpendicular to each other and further comprising a mirror to bend by 90° the optical axis of the first and second grating lenses therebetween.

20. An optical system according to claim 1, wherein each of said first and second grating lenses has two divided grating lenses, one for converting an incident beam of spherical wave to parallel rays of a beam and the other for diffracting the parallel rays of a beam to be non-parallel rays of a beam and further comprising a laser beam source, polarizing beam splitting means between the two grating lenses of the first grating lens, a ¼ wave plate between the polarizing beam splitting means and said predetermined point upon which the diffraction beam of the second grating lens is converged, and detecting means for detecting a reflection beam which is reflected at said predetermined point, wherein said polarizing beam splitting means transmits an inward beam which is issued from the laser beam source to be incident upon the first grating lens and the reflection beam which is reflected at said predetermined point and which travels on the same path as that of the inward beam in the grating lens assembly and reflects the other reflection beam or inward beam toward the detecting means.

21. An optical system according to claim 20, wherein said detecting means comprises at least one photodetector.

22. An optical system according to claim 20, wherein said first and second grating lenses are located to be perpendicular to each other and further comprising a mirror to bend by 90° the optical axis of the first and second grating lenses therebetween.

23. An optical system according to claim 20, wherein said two divided grating lenses of the second grating lenses are disposed perpendicular to each other and further comprising a mirror to bend by 90° the optical axis of the two divided grating lenses of the second grating lenses therebetween.

24. An optical system according to claim 1, wherein said predetermined point is located on an optical recording medium.

25. An optical system according to claim 24, wherein said optical recording medium is an optical disk.

26. An optical system according to claim 1, further comprising a laser beam source, polarizing beam splitting means between the laser beam source and the first grating lens, a ¼ wave plate between the polarizing beam splitting means and said predetermined point upon which the diffraction beam of the second grating lens is converged, detecting means for detecting reflection beam which is reflected at said predetermined point, said detecting means comprising two photodetectors, and a third grating lens which is located between the detecting means and the polarizing beam splitting means to partly transmit the reflection beam toward one of the photodetectors and partly diffract the reflection beam toward the other photodetector.

27. An optical system according to claim 26, wherein said ¼ wave plate is integrally formed with the first grating lens.

28. An optical system according to claim 26, wherein said polarizing beam splitting means and the third grating lens are integrally formed.

29. An optical system according to claim 28, further comprising a transparent plate which has opposite side faces on which said polarizing beam splitting means and said third grating lens are integrally provided.

30. An optical system according to claim 26, in particular adapted to construct an optical pickup, wherein said predetermined point is located on a optical disk and wherein one of said photodetectors is a focusing photodetector and the other is a tracking photodetector.

31. An optical system according to claim 30, wherein said focusing photodetector is comprised of a two-divided photodiode divided by a separation line perpendicular to the gratings of the third grating lens.

32. An optical system according to claim 30, wherein said tracking photodetector is comprised of a two-divided photodiode divided by a separation line parallel to the tracks of the optical disk.

33. An optical system according to claim 30, wherein said tracking photodetector is comprised of a two-divided photodiode divided by a separation line perpendicular to the gratings of the third grating lens.

34. An optical system according to claim 1, further comprising means between the first and second grating lenses for splitting a reflection beam which is reflected at said predetermined point outward far from the optical axis and detecting means in a space between the first and second grating lenses for detecting the split reflection beams.

35. An optical system according to claim 34, wherein said detecting means comprises two photodetectors.

36. An optical system according to claim 35, further comprising reflecting means provided substantially on the same plane as the first grating lens, corresponding to the photodetectors to reflect the split reflection beam toward the respective photodetectors.

37. An optical system according to claim 36, wherein said splitting means comprises a beam splitting hologram.

38. An optical system according to claim 37, further comprising a first transparent substrate which is provided on its opposite side faces with said splitting hologram and said reflecting means, a second transparent substrate which is secured to the first substrate and which is provided with said first grating lens on the side face far from the first substrate, and a third transparent substrate which is secured to the first substrate at the opposite side to the second substrate and which is provided with said second grating lens on the side face thereof far from the first substrate.

39. An optical system according to claim 38, wherein said photodetectors are secured to the opposite side faces of the first substrate, parallel to the optical axis.

40. An optical system according to claim 37, wherein said splitting hologram has at least two different hologram sections corresponding to the photodetectors.

41. A two-beam type of an optical pickup, in which two laser beams having different wavelengths emitted from respective two semiconductor lasers are converged upon different points of an optical information signal recording medium having tracks and are reflected at the different points to be received by respective photodetectors to record and read the information signal, the optical pickup comprising:
a grating lens assembly having a first grating lens which diffracts said two beams incident thereupon so as to provide non-parallel diffraction rays, respectively, and
second grating lens which converges the non-parallel diffraction rays at said different points substantially without aberration, respectively, said first and second grating lenses being located on a same optical axis, said first grating lens being provided with at least two pairs of first and second sections having different spatial frequency distributions, divided by planes including the optical axes, for the two beams, so that the two laser beams pass through the respective points of the recording medium by the second grating lens, and the signal beams which are reflected at the respective points are diffracted in symmetry with respect to the optical axis by the second grating lens to be converged upon the respective photodetectors by the respective second sections of the first grating lens.

42. An optical pickup according to claim 41, wherein said planes by which two pairs of sections are divided are offset relative to the tracks of the recording medium at a predetermined distance.

43. A focusing apparatus having a grating lens assembly comprising a first grating lens which diffracts rays of beam incident thereupon from a beam source so as to provide non-parallel diffraction rays and a second grating lens which converges the non-parallel diffraction rays at a predetermined point substantially without aberration, said first and second grating lenses being located on the same optical axis, said first and second grating lenses having spatial frequency distributions in which the converging point upon which the diffraction beam of the second grating lens is converged varies in accordance with a variation of the wavelength of the incident beam.

44. A focusing apparatus according to claim 43, wherein said beam source is a tunable laser having a variable wavelength beam emitted therefrom.

45. A focusing apparatus according to claim 43, further comprising a polygonal mirror which rotates to scan the beam along a predetermined pattern, wherein said focusing apparatus is provided between the polygonal mirror and the beam source to control the wavelength of the beam issued from the beam source thereby to control the focus of the grating lens assembly.

* * * * *

UNITED STATES PATENT AND TRADEMARK OFFICE
CERTIFICATE OF CORRECTION

PATENT NO. : 4,832,464  
DATED : May 23, 1989  
INVENTOR(S) : Masayuki Kato et al.

Page 1 of 4

It is certified that error appears in the above-identified patent and that said Letters Patent is hereby corrected as shown below:

Front Page, Col. 1, Foreign Patent Documents, line 1, "8/1982" should be --10/82--;

Front Page, Col. 2, line 3, "Sberrations" should be --Aberrations--;

line 8, "Communiations" should be --Communications--;

line 13, "p.391," should be --P. 391,--.

Col. 1, line 18, "elements" should be --elements.--.

Col. 8, line 40, start a new paragraph with paragraph indentation beginning with --(iii)--.

UNITED STATES PATENT AND TRADEMARK OFFICE
CERTIFICATE OF CORRECTION

PATENT NO. : 4,832,464
DATED : May 23, 1989
INVENTOR(S) : Masayuki Kato et al.

It is certified that error appears in the above-identified patent and that said Letters Patent is hereby corrected as shown below:

Col. 11, line 13, "$\overline{BQ} \cdot 19n_3$" should be --$\overline{BQ} \cdot n_3$--;

line 17, "②and②" should be --②and③,--;

line 62, "$\delta g_{2b}$" should be --$\delta g_{2B}$--;

line 67, "11" should be --⑪--.

Col. 12, line 14, "③" should be --⑬--.

Col. 16, line 27, "he" should be --the--.

Col. 17, line 53, "≈" should be --$\doteq$--;

line 54, "≈" should be --$\doteq$--.

Col. 22, line 37, "beam-" should be --beam--.

UNITED STATES PATENT AND TRADEMARK OFFICE
CERTIFICATE OF CORRECTION

PATENT NO. : 4,832,464

DATED : May 23, 1989

INVENTOR(S) : Masayuki et al.

It is certified that error appears in the above-identified patent and that said Letters Patent is hereby corrected as shown below:

Col. 24, line 42, "de-" should be --photodiodes as mentioned above and can be any photo-de---.

Col. 25, line 59, "Thus" should be --Thus,--.

Col. 28, line 41, "mentioned before." should be --mentioned.--.

Col. 29, line 29, "specifically" should be --Specifically,--.

Col. 31, line 39, delete "the" (second occurrence).

Col. 34, line 46, "64 and 64." should be --63-65--.

Col. 35, line 33, "an" should be --a--.

UNITED STATES PATENT AND TRADEMARK OFFICE
CERTIFICATE OF CORRECTION

PATENT NO. :  4,832,464

DATED      :  May 23, 1989

INVENTOR(S) :  Masayuki Kato et al.

It is certified that error appears in the above-identified patent and that said Letters Patent is hereby corrected as shown below:

Col. 36, line 5, "$\pi_c$" should be --$\lambda_c$--.

Col. 37, line 29, "lens equal" should be --lens has a frequency band equal--.

Col. 40, line 23, before "second" insert --a--;

line 33, "respective points" should be --respective first sections and are converged upon the respective points--.

Signed and Sealed this

Thirty-first Day of July, 1990

Attest:

HARRY F. MANBECK, JR.

*Attesting Officer*   *Commissioner of Patents and Trademarks*